United States Patent
Saito et al.

(10) Patent No.: US 7,161,603 B2
(45) Date of Patent: Jan. 9, 2007

(54) IMAGE RENDERING DEVICE AND IMAGE RENDERING METHOD

(75) Inventors: Takahiro Saito, Kanagawa (JP); Kenichi Mori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 370 days.

(21) Appl. No.: 10/651,977

(22) Filed: Sep. 2, 2003

(65) Prior Publication Data

US 2004/0212619 A1  Oct. 28, 2004

(30) Foreign Application Priority Data

Apr. 28, 2003  (JP) ............... 2003-123986

(51) Int. Cl.
*G06T 15/00* (2006.01)
*G06T 17/40* (2006.01)

(52) U.S. Cl. .............. 345/614; 345/426; 345/545

(58) Field of Classification Search ........ 345/418–422, 345/428, 581–582, 426, 506, 545, 546, 553, 345/634, 611–614; 382/154, 254, 305, 307
See application file for complete search history.

(56) References Cited

U.S. PATENT DOCUMENTS

| 5,764,243 | A | * | 6/1998 | Baldwin | ............ | 345/506 |
|---|---|---|---|---|---|---|
| 5,990,904 | A | * | 11/1999 | Griffin | ............ | 345/631 |
| 6,198,488 | B1 | | 3/2001 | Lindholm et al. | | |
| 6,433,788 | B1 | * | 8/2002 | Morein | ............ | 345/557 |
| 6,654,020 | B1 | | 11/2003 | Mori | | |
| 6,967,663 | B1 | * | 11/2005 | Bastos et al. | ............ | 345/613 |
| 2002/0196255 | A1 | | 12/2002 | Saito | | |
| 2003/0002729 | A1 | * | 1/2003 | Wittenbrink | ............ | 382/154 |
| 2004/0080512 | A1 | * | 4/2004 | McCormack et al. | ....... | 345/543 |
| 2005/0052459 | A1 | * | 3/2005 | Lewis | ............ | 345/441 |

FOREIGN PATENT DOCUMENTS

| CN | 1386262 A | 12/2002 |
|---|---|---|
| CN | 1102769 C | 3/2003 |
| EP | 0 582 875 A2 | 2/1994 |
| EP | 0 984 392 A1 | 3/2000 |
| JP | 6-203169 | 7/1994 |
| JP | 8-161509 | 6/1996 |
| JP | 11-144074 | 5/1999 |
| KR | 2001-85424 | 9/2001 |
| WO | WO 00/19377 | 4/2000 |

* cited by examiner

*Primary Examiner*—Kee M. Tung
*Assistant Examiner*—Wesner Sajous
(74) *Attorney, Agent, or Firm*—Oblon, Spivak, McClelland, Maier & Neustadt, P.C.

(57) ABSTRACT

An image rendering device disclosed herein comprises a fragment generator configured to generate a set of fragments including pixels in different positions based on inputted pixel data; and a pixel processor configured to sequentially process the pixel data contained in the fragment generated by the fragment generator.

23 Claims, 32 Drawing Sheets

| INPUT | PARENT | CHILD | GRANDCHILD | GREAT-GRANDCHILD | OUTPUT DESTINATION |
|---|---|---|---|---|---|
| ... | ... | ... | ... | ... | ... |
| ▨ | ▨ | ▨ | ▨ | ▨ | PARENT |
| ... | ... | ... | ... | ... | ... |
| ▨ | ● | ▨ | ▨ | ▨ | CHILD |
| ... | ... | ... | ... | ... | ... |
| ▨ | ● | ●● | ▨ | ▨ | GRANDCHILD |
| ▨ | ● | ●● | ▨ | ▨ | CHILD |
| ▨ | ● | ●● | ▨ | ▨ | PARENT |
| ... | ... | ... | ... | ... | ... |

FIG. 26

CHUNK IN FORM OF INTERLEAVE

| 1 | 2 | 1 | 2 | 1 | 2 | 1 | 2 | 1 | 2 | 1 | 2 | 1 | 2 | 1 | 2 |
|---|---|---|---|---|---|---|---|---|---|---|---|---|---|---|---|
| 3 | 4 | 3 | 4 | 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 | 3 | 4 | 3 | 4 |

IMAGE RENDERING DEVICE AND IMAGE RENDERING METHOD

CROSS REFERENCE TO RELATED APPLICATION

This application claims benefit of priority under 35 U.S.C.§119 to Japanese Patent Application No. 2003-123986, filed on Apr. 28, 2003, the entire contents of which are incorporated by reference herein.

BACKGROUND OF THE INVENTION

1. Field of the Invention

The present invention relates to an image rendering device and an image rendering method.

2. Description of the Related Art

Generally, even if, in a depth test and an alpha blend, a write process is performed in the same pixel position during the time from when a current value is read from a frame buffer until a value of a processing result is written, the result of the write process can not be reflected, and hence a correct processing result can not be obtained. Therefore, in a related art, there is a mechanism in which the position of a pixel being processed at present is held in a pixel processor and compared with the position of a pixel to be newly processed, and when the position of the pixel to be newly processed matches that of the pixel being processed, the completion of processing is waited for.

FIG. 1 is a block diagram showing the configuration of a related image rendering device. A rasterizer 10 shown in FIG. 1 performs the processing of expanding a polygon on an image memory on a pixel-by-pixel basis.

For example, pixel-by-pixel colors are determined by interpolating colors given to respective vertexes by a method called smooth shading. In this case, a pixel processor 20 hides (does not render) an object which is hidden behind another object and invisible by a hidden surface removal algorithm called a Z-buffer algorithm. This is also called a depth test. The pixel processor 20 includes a register 22 and an arithmetic unit 24, and frame buffer values in a memory 30 and values from the rasterizer are stored in sequence in the register 22, processed by texture mapping and a Z-buffer algorithm in the arithmetic unit 24, and stored again in the register 22. The contents of the register 22 are outputted to the memory 30 which is a frame buffer. Accordingly, when the memory 30 acquires an operation result from the register 22, it is required to determine by comparison whether a processing position which is being processed by the arithmetic unit 24 and a processing position which is to be acquired from the memory 30 match each other, and when these processing positions match each other, to wait for the start of the processing of the corresponding pixel.

However, with an increase in the clock frequency of LSI, latency in processing (time from when data is inputted to the register 22 in FIG. 2 until the data is outputted) becomes longer, whereby the number of pixels which need to be held increases, which causes problems of enlargement of a comparator and an increase in stop rate due to a match between processing positions.

On the other hand, due to an increase in the scale of the LSI, the degree of parallelism for pixel processors which can be mounted on the LSI increases, but in the related art, only part of many arranged pixel processors can be brought into operation in small polygon processing, and hence the processing efficiency does not increase as much as the circuit scale.

SUMMARY OF THE INVENTION

In order to accomplish the aforementioned and other objects, according to one aspect of the present invention, an image rendering device, comprises:

a fragment generator configured to generate a set of fragments including pixels in different positions based on inputted pixel data; and a pixel processor configured to sequentially process the pixel data contained in the fragment generated by the fragment generator.

According to another aspect of the present invention, an image rendering device, comprises:

a data buffer configured to hold rasterization results of polygons, wherein the data buffer merges the rasterization results which do not conflict with each other and holds them as one rasterization result; and a pixel processor configured to acquire the rasterization result from the data buffer and sequentially process pixel data contained in the rasterization result.

According to a further aspect of the present invention, an image rendering method, comprises:

generating a set of fragments including pixels in different positions based on inputted pixel data; and sequentially processing the pixel data contained in the generated fragment.

According to a still further aspect of the present invention, an image rendering method, comprises:

holding rasterization results of polygons, and merging the rasterization results which do not conflict with each other and holding them as one rasterization result; and acquiring the rasterization result from the data buffer and processing pixel data contained in the rasterization result in sequence.

According to another aspect of the present invention, a graphic system comprises:

a memory in which vertex data to render object is stored;

a CPU configured to read out the vertex data from the memory to execute processing and output the result of the processing as pixel data; and an image rendering device including:

a fragment generator configured to generate a set of fragments including pixels in different positions based on the inputted pixel data; and a pixel processor configured to sequentially process the pixel data contained in the fragment generated by the fragment generator.

BRIEF DESCRIPTION OF THE DRAWINGS

FIG. 26 is a diagram explaining the contents of the table in FIG. 25;

FIG. 29 is a diagram explaining an example in which a chunk is composed of pixels which are located apart from each other;

DETAILED DESCRIPTION OF THE EMBODIMENTS

In this embodiment, in rasterization processing, a buffer is disposed after setup/DDA (Digital Differential Analysis) processing, and rasterization results of plural polygons are buffered and merged, and then processed by pixel processor. Further details will be given below.

Figure 3:
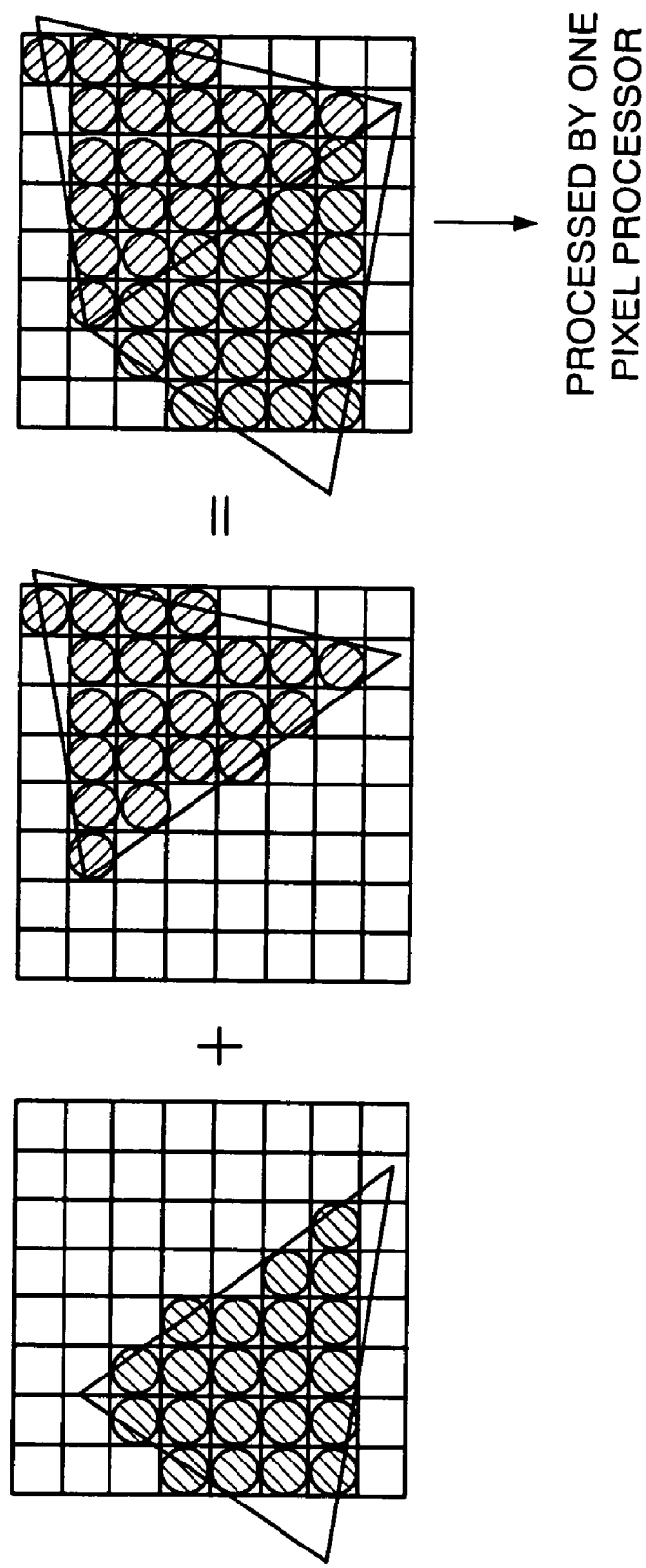
FIG. 3 is a diagram explaining the concept of a merger of chunks in an embodiment.

FIG. 3 is a diagram explaining the concept of merging rasterization results in this embodiment. As shown in FIG. 3, in this embodiment, the concept of a "chunk", in which neighboring plural pixels are gathered together, is introduced. In the example in FIG. 3, one chunk is composed of 8×8=64 pixels. This chunk is a fragment in this embodiment. By using the concept of the chunk, it is guaranteed that pixels which are continuously thrown in are not in the same position, and the chunk is processed by a pixel processor. In small graphics primitives (triangle, polygon), the proportion of valid pixels in one chunk is low, and hence a merger is carried out as shown in FIG. 3. In the example in FIG. 3, two graphics primitives are merged and represented as pixels in one chunk.

Figure 4:
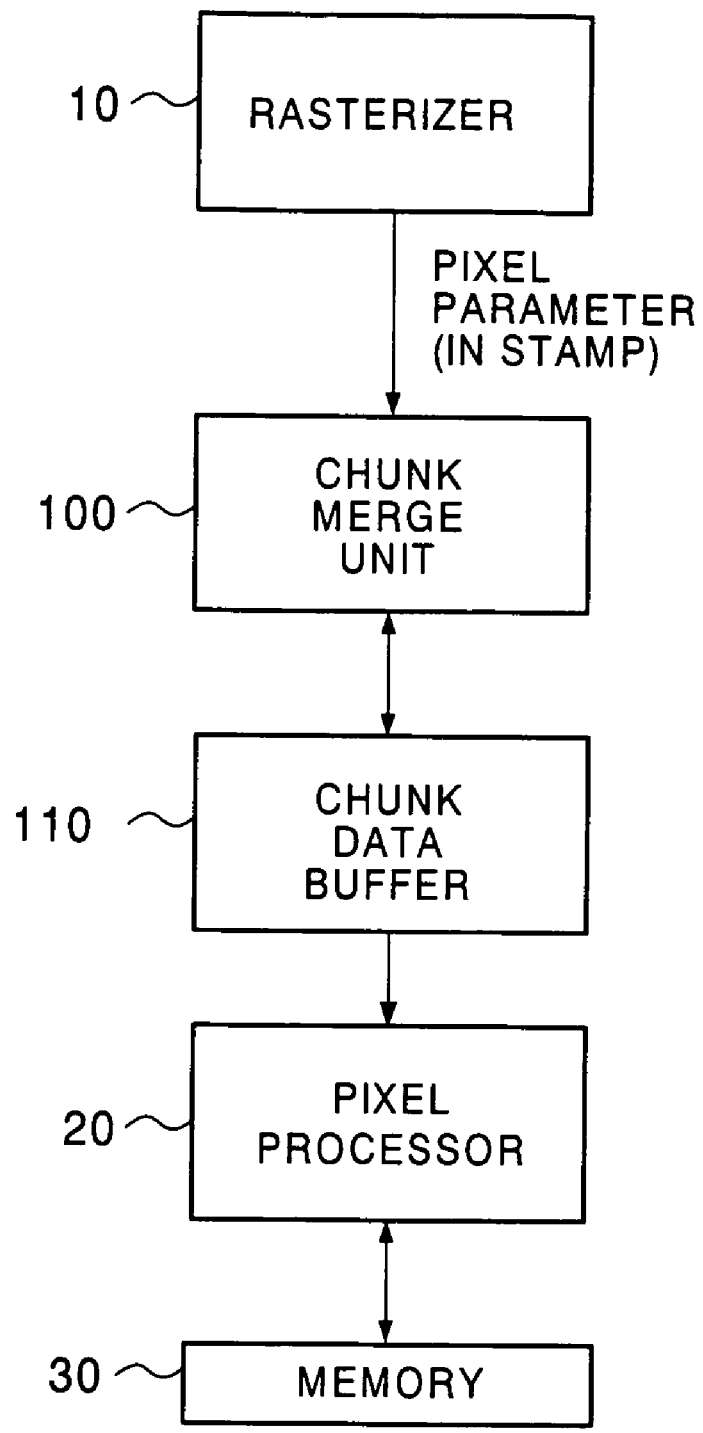
FIG. 4 is a block diagram explaining the configuration of an image rendering device according to this embodiment.

FIG. 4 is a block diagram showing the basic configuration of an image rendering device according to this embodiment. As shown in FIG. 4, in the image rendering device according to this embodiment, a chunk merge unit 100 and a chunk data buffer 110 are additionally inserted between a rasterizer 10 and a pixel processor 20.

The rasterizer 10 performs the processing of expanding a polygon on an image memory on a pixel-by-pixel basis. Pixel-by-pixel colors are determined by interpolating colors given to respective vertexes by a method called smooth shading. The rasterizer 10 outputs pixel-by-pixel data as a rasterization result to the chunk merge unit 100.

The chunk merge unit 100 converts the pixel-by-pixel data into chunk-by-chunk data and performs a merger of data. Data resulted from the merger is outputted to the chunk data buffer 110. In the chunk merge unit 100, at the time of a merger of chunks, pixel data with a deeper depth may be abandoned based on depths of respective pixels. In other words, the chunk merge unit 100 may have a depth test function. The chunk data buffer 110 is a data buffer, and the pixel processor 20 acquires chunk data stored in the chunk data buffer 110.

The pixel processor 20 processes the merged chunk data. Namely, the pixel processor 20 executes a hidden surface removal algorithm called a Z-buffer algorithm for the chunk data (depth test function). Even when the chunk merge unit 100 has a depth test function, the pixel processor 20 also needs to perform a depth test for correct hidden surface removal.

The image rendering device shown in FIG. 4 has the most basic configuration, and one chunk data buffer 110 and one pixel processor 20 are provided for one chunk merge unit 100. It is possible to simultaneously store one or more pieces of chunk data in the chunk data buffer 110.

Figure 5:
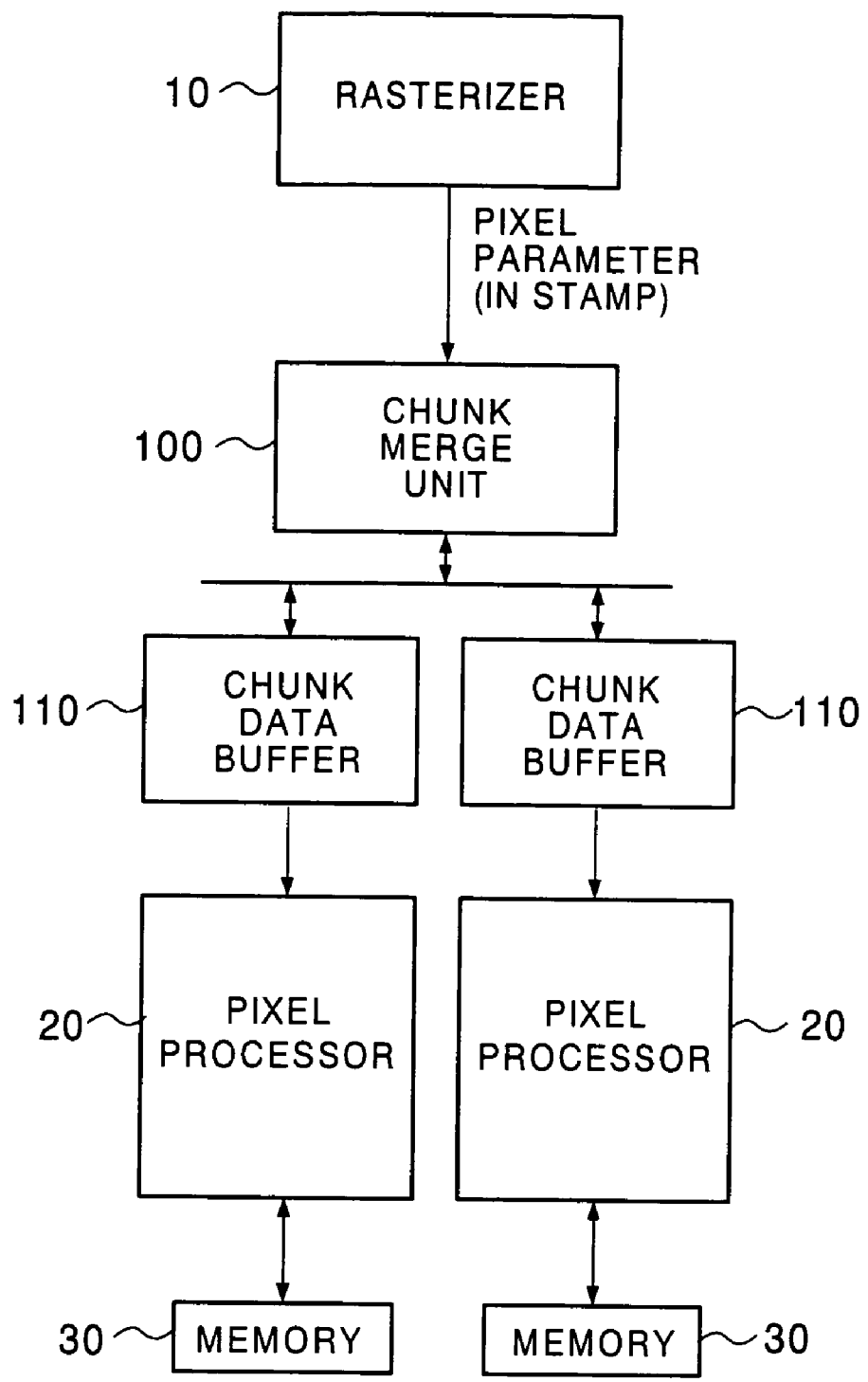
FIG. 5 is a block diagram explaining a modification of the configuration of the image rendering device.

FIG. 5 is a diagram showing a modification of the image rendering device. In the example in FIG. 5, plural pixel processors 20 are provided for one chunk merge unit 100, and a memory 30 is fixed to each of the pixel processors 20. In the example in FIG. 5, two pixel processors 20 are provided for one chunk merge unit 100. Chunk data to be processed by each of the pixel processors 20 is fixedly determined by the position (X-coordinate, Y-coordinate) of a chunk. A one-to-one correspondence is established between the chunk data buffers 110 and the pixel processors 20, and the chunk merge unit 100 determines which pixel processor 20 processes the chunk data.

Figure 6:
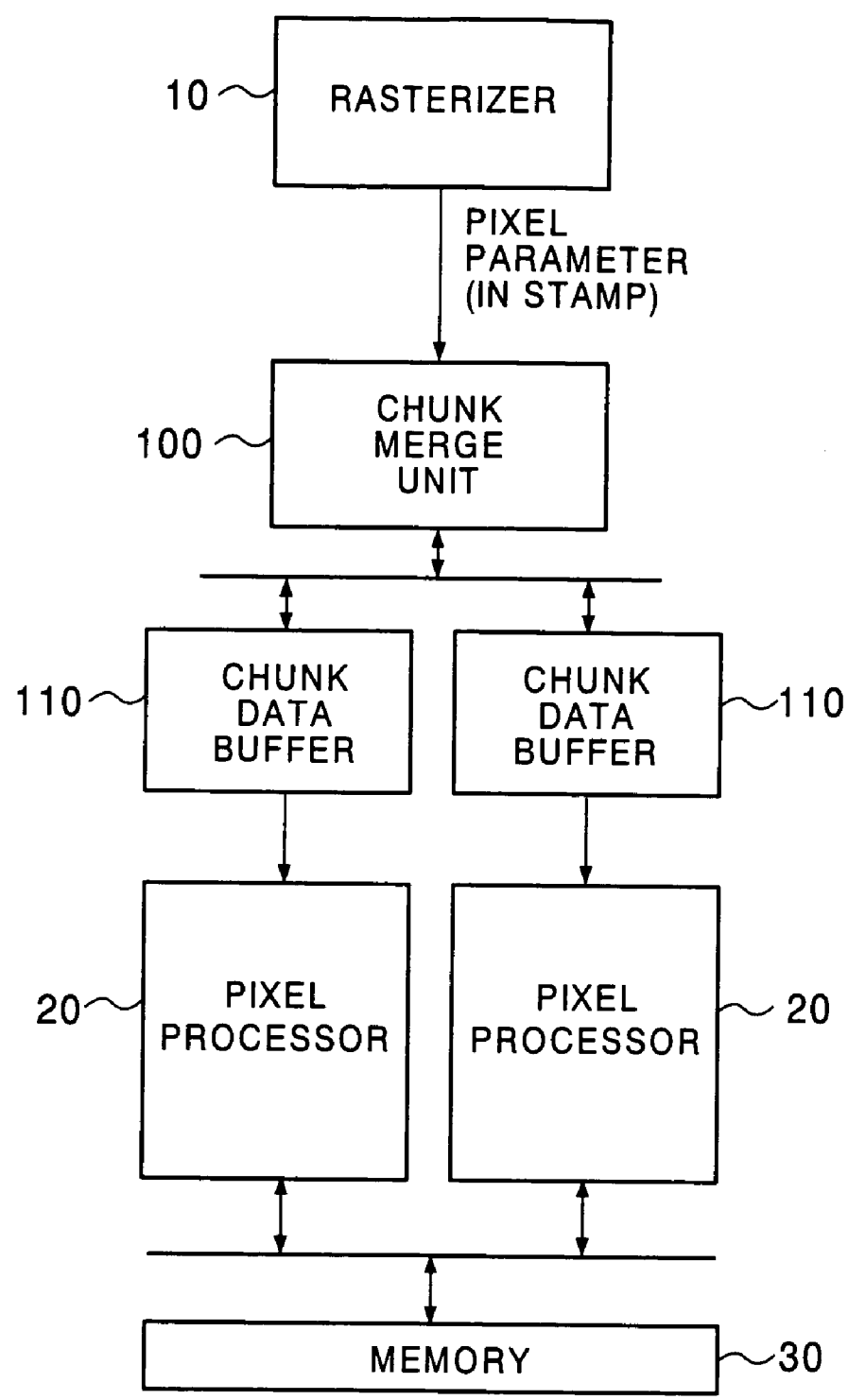
FIG. 6 is a block diagram explaining another modification of the configuration of the image rendering device.

FIG. 6 is a diagram showing another modification of the image rendering device. In the example in FIG. 6, the pixel processors 20 and the memory 30 are connected by a bus. The bus may be a unibus or a multibus. The example in FIG. 6 is effective when the memory 30 is formed on a different chip from the pixel processors 20. In this case, each pixel processor 20 can access the entire region of the memory 30.

Figure 7:
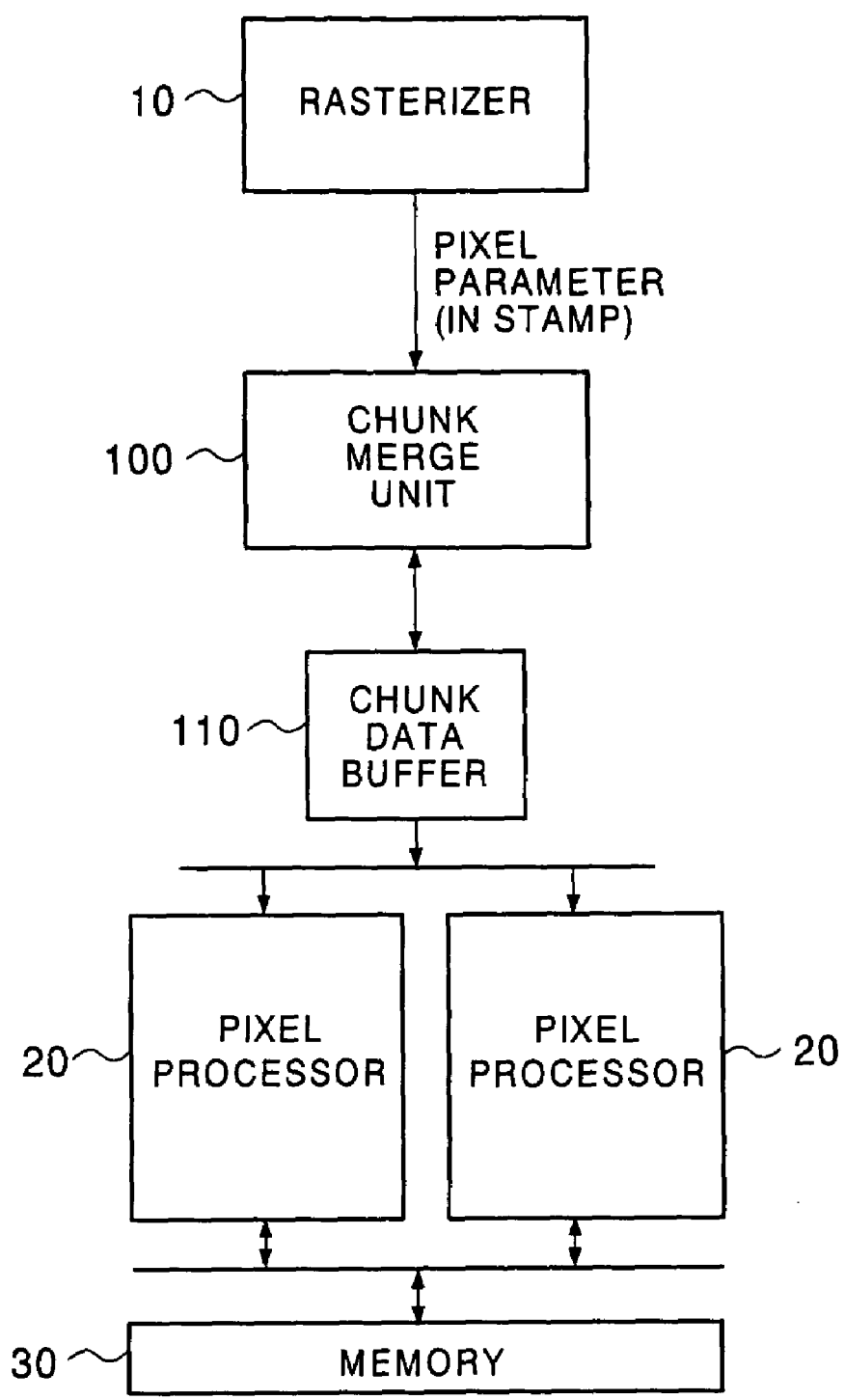
FIG. 7 is a block diagram explaining still another modification of the configuration of the image rendering device.

FIG. 7 is a diagram showing still another modification of the image rendering device. In the example in FIG. 7, plural pixel processors 20 are provided, but no restriction is put on the connection relationship between the chunk data buffer 110 and the pixel processors 20. Namely, chunk data to be processed by each pixel processor 20 is optional, and the next chunk data is processed when the pixel processor 20 is available. In other words, each of the pixel processors 20 can process chunk data in any position. Hence, load distribution between the pixel processors 20 becomes easy. However, a mechanism not to simultaneously process the same position chunks is needed.

Figure 8:
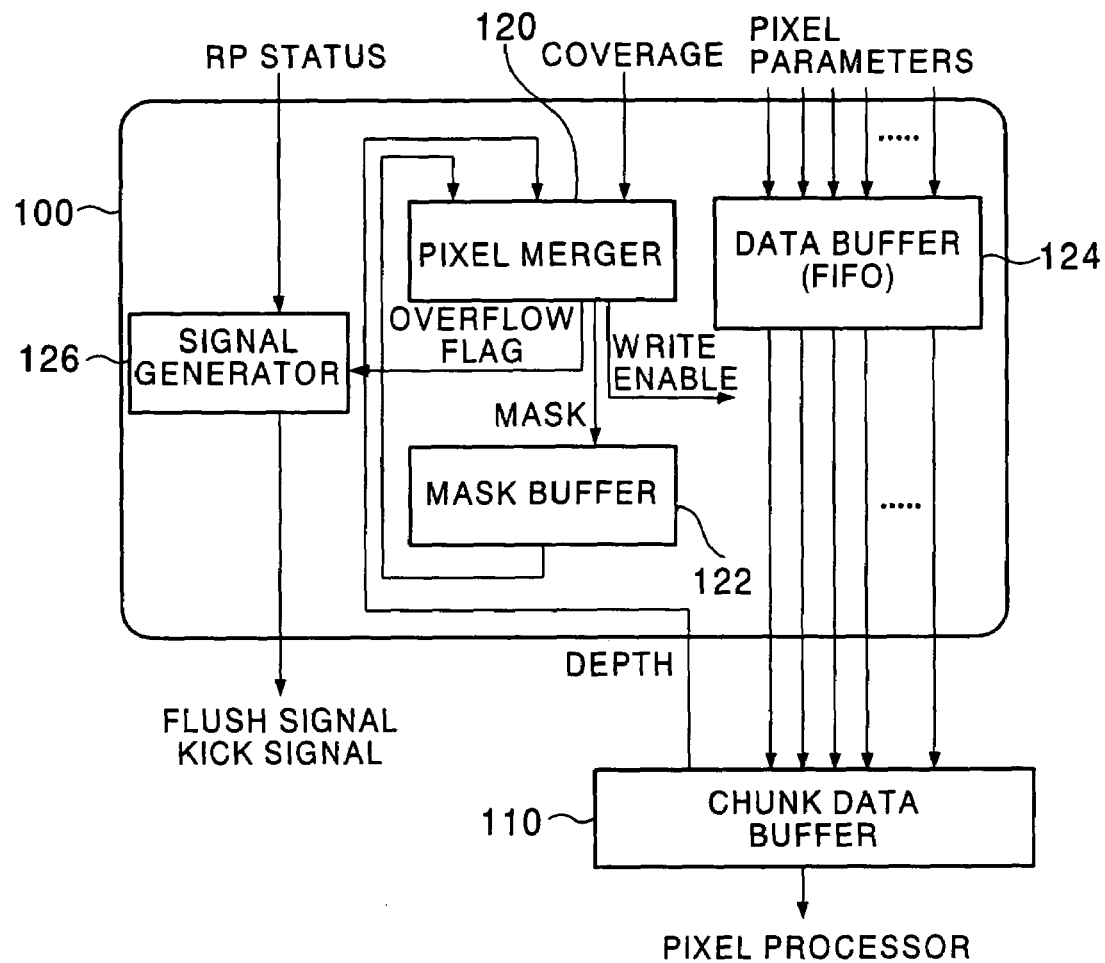
FIG. 8 is a block diagram explaining the configuration of a chunk merge unit according to this embodiment.

FIG. 8 is a block diagram showing the configuration of the chunk merge unit 100 according to this embodiment in detail. As shown in FIG. 8, the chunk merge unit 100 according to this embodiment includes a pixel merger 120, a mask buffer 122, a data buffer 124, and a signal generator 126.

The pixel merger 120 checks whether pixels generated from different primitives are merged. In the example in FIG. 8, depths of pixels, which are contained in chunks stored in the chunk data buffer 110, are also inputted to the pixel merger 120. Therefore, the pixel merger 120 compares a depth of pixel data stored in the chunk data buffer 110 and a depth of pixel data inputted from the rasterizer 10 and abandons the pixel data with a deeper depth. Namely, it can be said that the chunk merge unit 100 in FIG. 8 has a depth test function, too.

The mask buffer 122 holds whether a write has been performed to each of pixels as a status in the chunk data buffer 110. This status is composed of 1-bit data per pixel.

The data buffer 124 temporarily holds parameters of respective pixels. The signal generator 126 determines whether to flush the chunk data buffer 110 and start a controller of the pixel processor 20 based on an RP status and an overflow flag.

Coverage and pixel parameters are data inputted from the rasterizer 10. The coverage is information indicating whether the pixel parameters are valid or invalid. That is, the coverage is information indicating whether it is inside or outside the triangle. The RP status is status information indicating whether the pixel processor 20 is in the middle of processing, and it is inputted from the pixel processor 20.

Chunk data outputted from the data buffer 124 to the chunk data buffer 110 is 32 bits×(6 to 8 parameters) per pixel, and written to the chunk data buffer 110 in each cycle. The chunk data buffer 110 determines to which chunk the inputted chunk data relates, and writes the chunk data to the determined chunk. The pixel merger 120 determines whether the chunk data is actually written. Namely, the pixel merger 120 outputs a write enable to the chunk data buffer 110 when a write process is performed.

Figure 9:
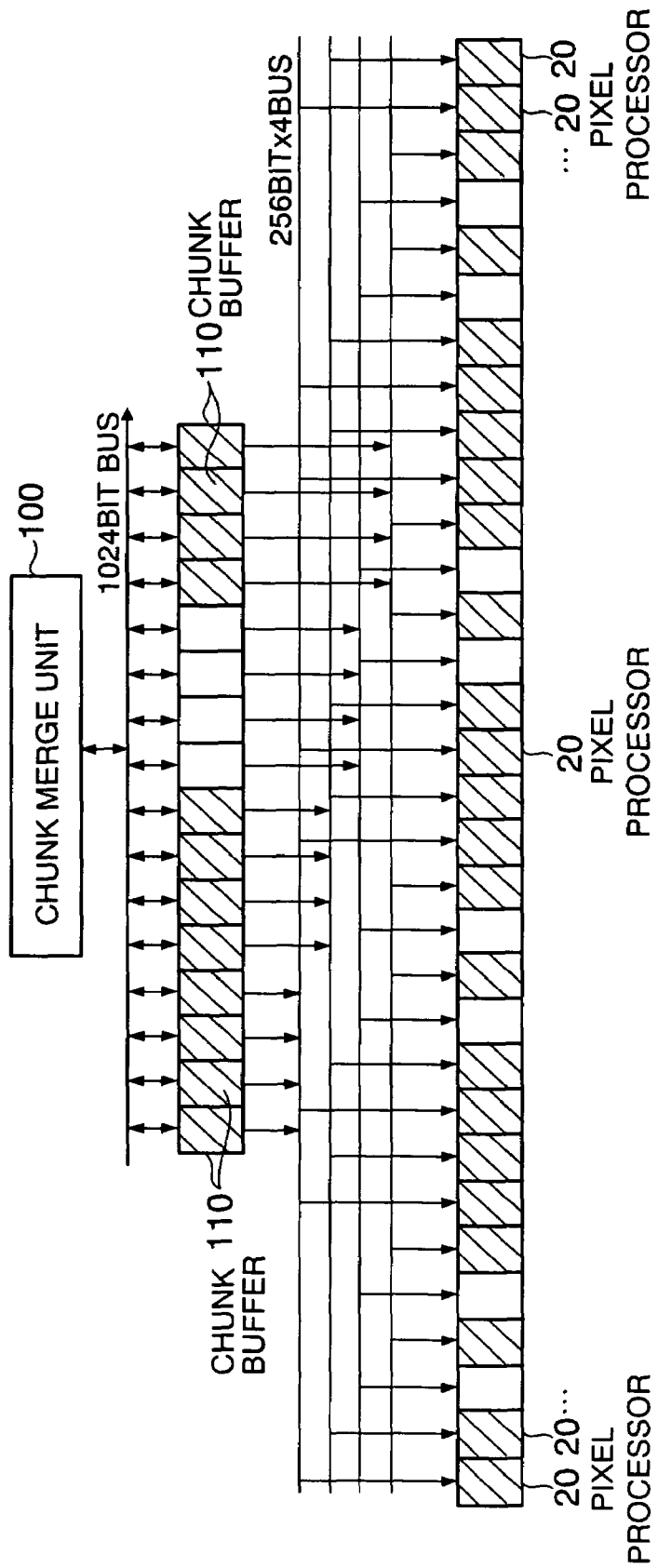
FIG. 9 is a diagram explaining the connection relation between chunk data buffers and pixel processors.

FIG. 9 is a diagram showing an example of the connection relation between the chunk data buffers 110 and the pixel processors 20. In the example shown in FIG. 9, 16 chunk data buffers 110 and 32 pixel processors 20 are provided. Accordingly, ideally speaking, the chunk data buffers 110 and the pixel processors 20 have a full X-bar configuration of the ratio of 16:32, but in this embodiment, a configuration in which four chunk data buffers 110 and eight pixel processors 20 are connected to each of four 256-bit buses is adopted. The chunk merge unit 100 and the chunk data buffers 110 are connected by a 1024-bit bus.

Figure 10:
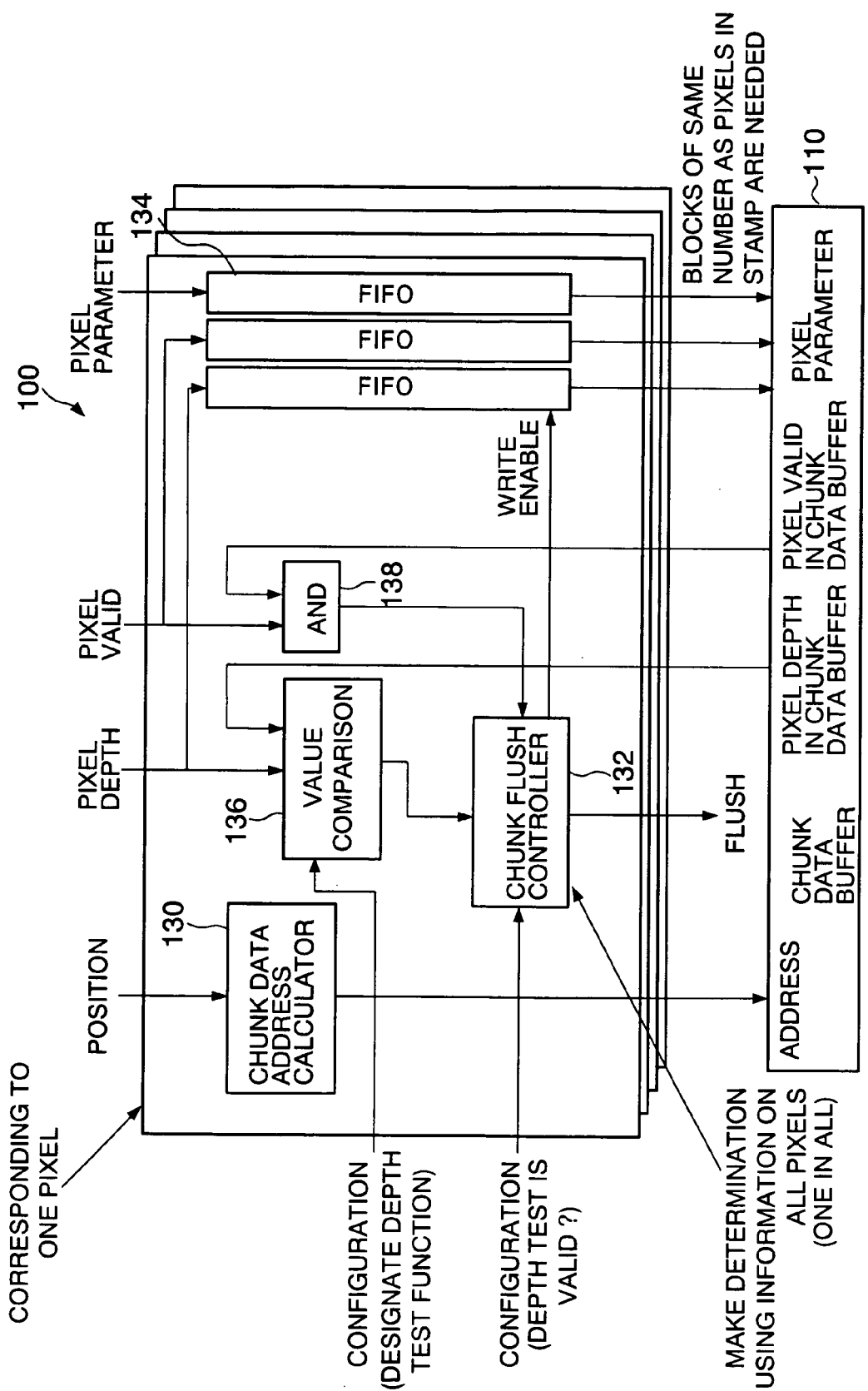
FIG. 10 is a block diagram explaining another configuration of the chunk merge unit according to this embodiment.

FIG. 10 is a block diagram showing another configuration example of the chunk merge unit 100 according to this embodiment in detail. In this example, a block shown in FIG. 10 is provided for every pixel. Accordingly, in this embodiment, the number of blocks shown in FIG. 10 must be the same as the number of pixels in a stamp. Since 2×2=4 pixels constitutes one stamp in this embodiment, four blocks shown in FIG. 10 are needed for one stamp.

As shown in FIG. 10, the chunk merge unit 100 corresponding to one pixel includes a chunk data address calculator 130, a chunk flush controller 132, a buffer 134, a value comparison circuit 136, and an AND circuit 138.

The chunk data address calculator 130 calculates an address in the chunk data buffer 110 which holds chunk data containing X and Y coordinates of a pixel to be processed.

The chunk flush controller 132 determines whether pixel or stamp data inputted from the rasterizer 10 and pixel or stamp data in the chunk flush controller 132 conflict with each other. Alternatively, the chunk flush controller 132 determines which data is to be left according to their pixel depths.

When both data conflict with each other, the chunk flush controller 132 transmits chunk data in the chunk data buffer 110 at this point in time to the pixel processor 20, defines a new chunk, and write the pixel data inputted from the rasterizer 10 in the new chunk. Moreover, if the data to be left can be determined based on the pixel depths and the like, the chunk merge unit 100 determines whether the pixel data inputted from the rasterizer 10 is abandoned or the pixel data inputted from the rasterizer 10 is overwritten in the chunk data buffer 110.

The buffer 134 is simply FIFO, and holds the pixel data inputted from the rasterizer 10 during the aforementioned process. The value comparison circuit 136 compares the values of a pixel depth depth1 inputted from the rasterizer 10 and a pixel depth depth2 in the chunk data buffer 110. Then, it determines a value comparison result from depth1>depth2, depth1≧depth2, depth1≦depth2, depth1<depth2, depth1≠depth2, depth1=depth2, and regular overwriting. In other words, based on the comparison result by the value comparison circuit 136, the chunk merge unit 100 performs a depth test and abandons one of the pixel data inputted from the rasterizer 10 and the same position pixel data in the chunk data buffer 110.

The AND circuit 138 performs an AND operation, in which case the pixel inputted from the rasterizer 10 is valid and the pixel in the chunk data buffer 110 is valid.

Figure 11:
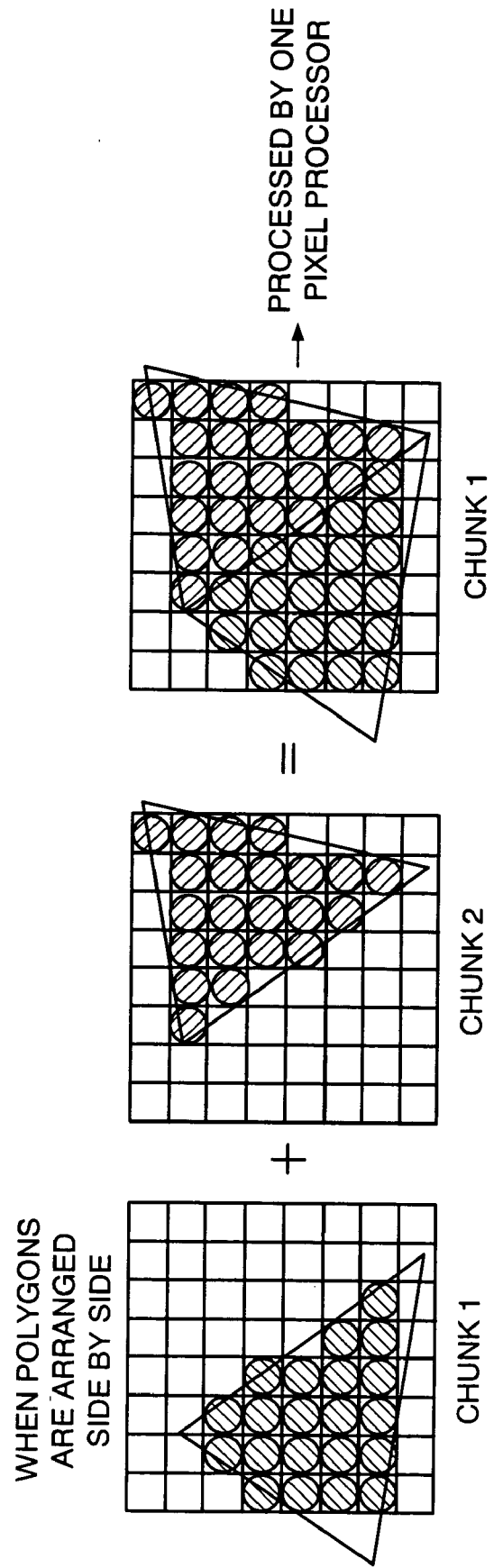
FIG. 11 is a diagram showing an example in which two polygons are merged in a case where conflict determination is performed on a pixel-by-pixel basis and chunks are merged on a pixel-by-pixel basis.
Figure 12:
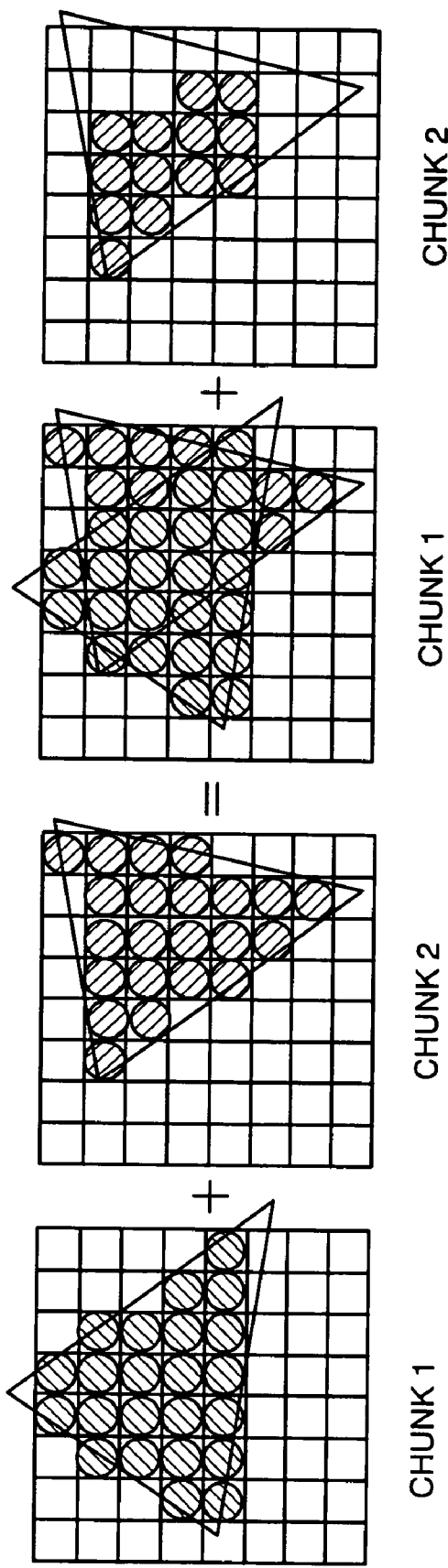
FIG. 12 is a diagram showing another example in which two polygons are merged in the case where conflict determination is performed on a pixel-by-pixel basis and chunks are merged on a pixel-by-pixel basis.

FIG. 11 and FIG. 12 are diagrams explaining the processing concept of merging chunks on a pixel-by-pixel basis. FIG. 11 is a diagram explaining a merger when polygons are arranged side by side in different chunks, and FIG. 12 is a diagram explaining a merger when polygons overlap each other in different chunks.

Figure 1:
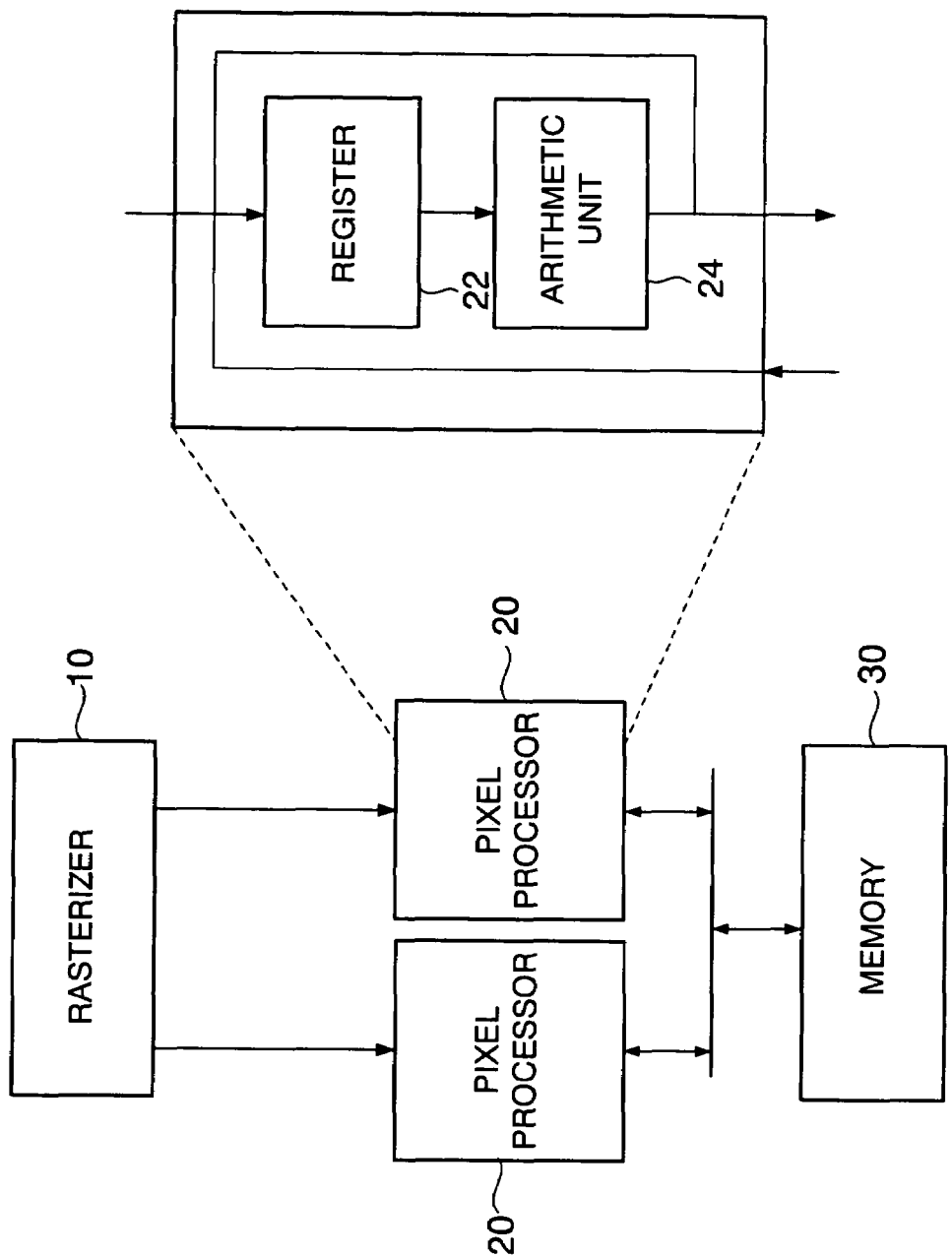
FIG. 1 is a block diagram showing the configuration of a related image rendering device.
Figure 2:
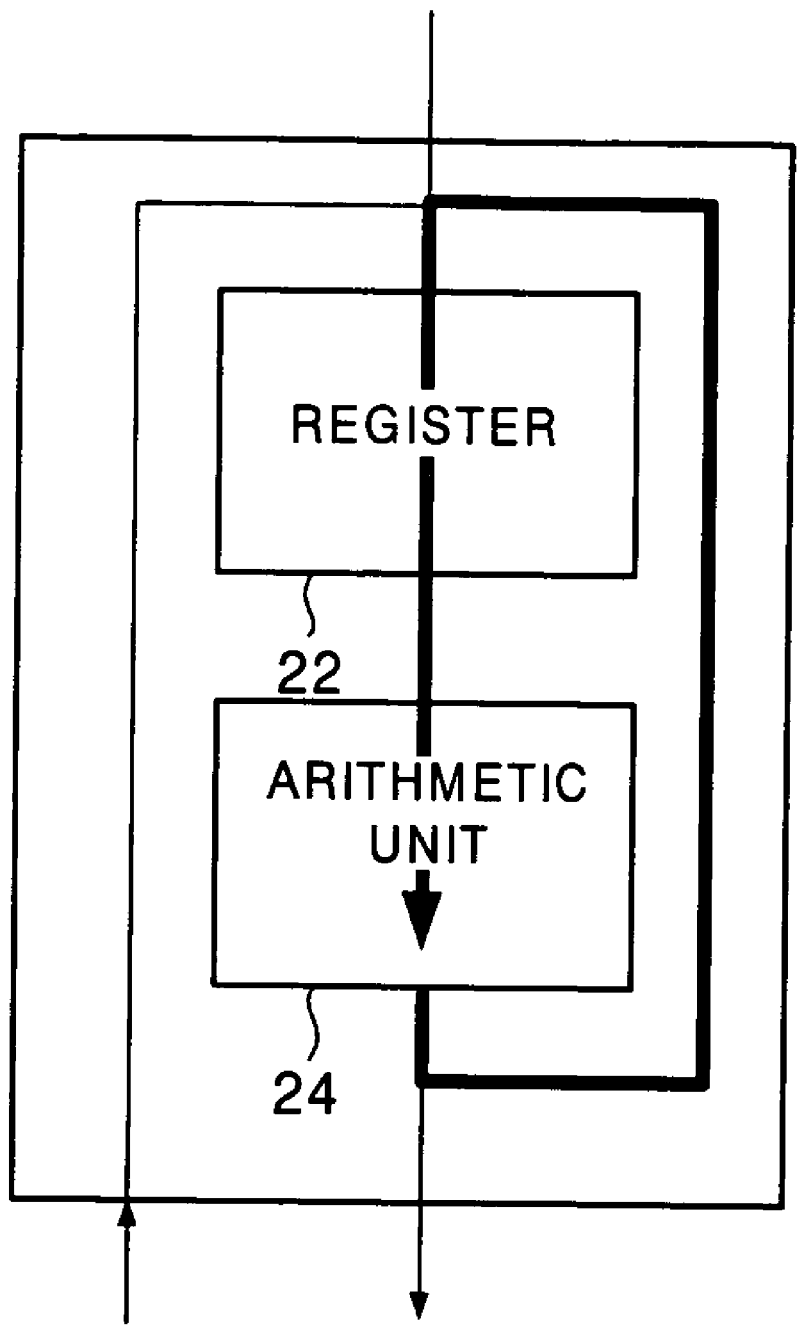
FIG. 2 is a block diagram explaining a problem in the related image rendering device.

In the merging processing shown in FIG. 11 and FIG. 12, whether pixels in respective chunks conflict with each other is determined on a pixel-by-pixel basis and the chunks are merged on a pixel-by-pixel basis. In the example in FIG. 1, it is assumed that a chunk 1 stored in the chunk data buffer 110 and a chunk 2 inputted from the rasterizer 10 are in the same position. In the example in FIG. 11, pixel data in the chunk 1 stored in the chunk data buffer 110 and pixel data in the chunk 2 inputted from the rasterizer 10 do not overlap each other. Hence, the pixel data formed from two polygons are merged into one chunk 1, and stored as one chunk data in the chunk data buffer 110. Accordingly, pixels of these two polygons are processed by one pixel processor 20.

On the other hand, in the example in FIG. 12, pixel data in the chunk 1 stored in the chunk data buffer 110 and pixel data in the chunk 2 inputted from the rasterizer 10 overlap each other. Namely, these pixel data exists at the same X coordinate and Y coordinate. Therefore, new pixels of the chunk 2 are added only to pixels, in which no data exists, of the chunk 1, and the remaining pixels of the chunk 2 are generated as pixels of the new chunk 2. Accordingly, pixels of these two polygons are separately stored as two pieces of chunk data in the chunk buffer data 110 and separately processed by the pixel processors 20.

In the merging method shown in FIG. 11 and FIG. 12, the filling factor increases, but first derivative calculation with the next pixel differs according to a merger result.

Figure 13:
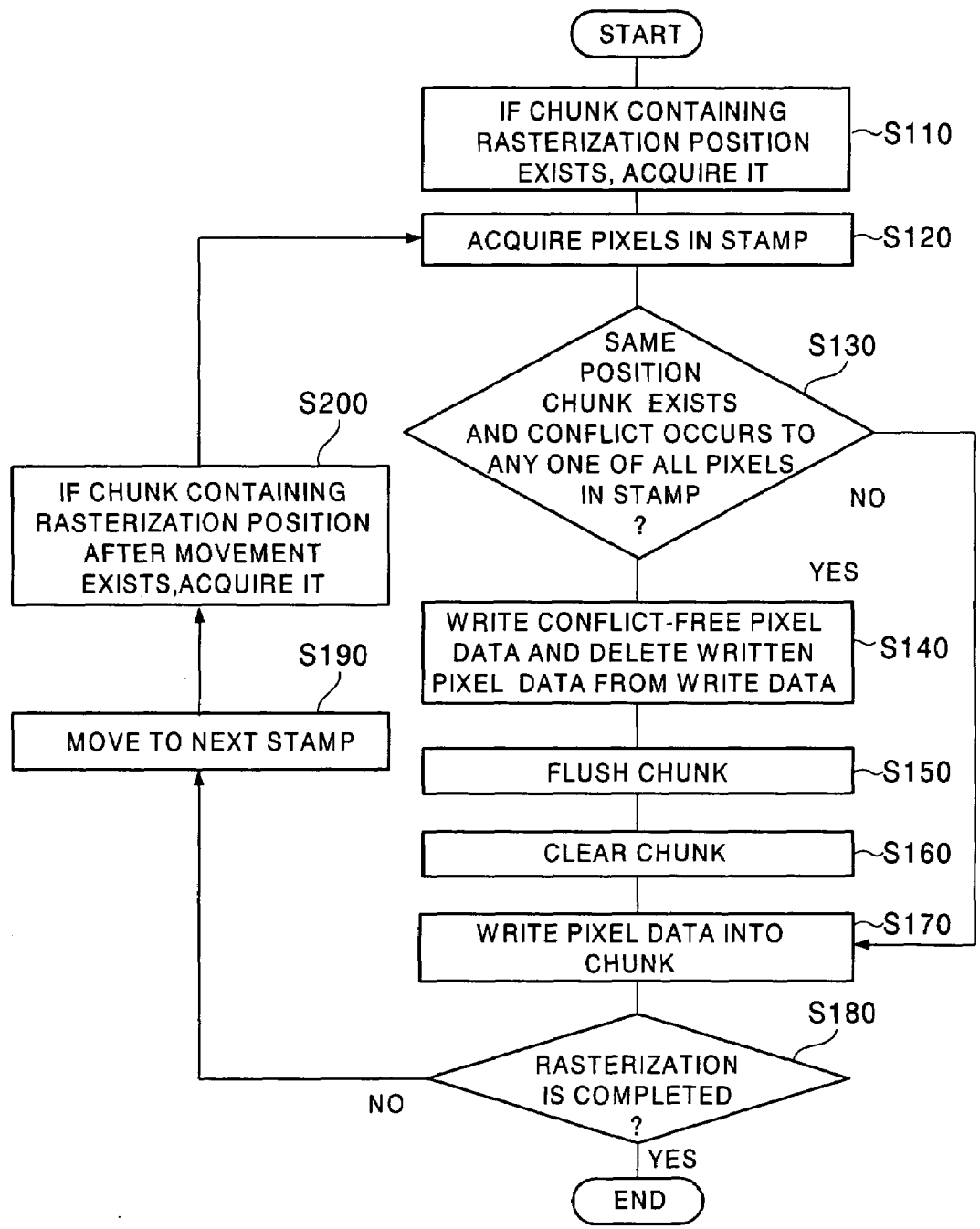
FIG. 13 is a flowchart explaining merging processing in the case where conflict determination is performed on a pixel-by-pixel basis and chunks are merged on a pixel-by-pixel basis.

FIG. 13 is a flowchart for explaining pixel-by-pixel merging processing such as shown in FIG. 11 and FIG. 12. As shown in FIG. 13, it is determined whether a chunk containing a rasterization position inputted from the rasterizer 10 exists in the chunk buffer 110, and if the chunk exists, the chunk is acquired (step S110). This processing in step S110 is performed by the chunk data address calculator 130 of the chunk merge unit 100.

Then, the chunk merge unit 100 acquires pixels in a stamp (step S120). Subsequently, the chunk merge unit 100 determines whether two chunks to be merged are in the same position and a conflict occurs to any of all pixels in respective stamps (step S130). When no conflict occurs to any pixel (step S130: No), pixel data is additionally written into the existing chunk (step S170).

On the other hand, if a conflict occurs to any pixel (step S130: Yes), only pixels which do not conflict are additionally written into the existing chunk and pixel data which has been written is deleted from write data (step S140). Subsequently, after flushing the chunk (step S150), the chunk merge unit 100 clears the chunk (step S160). Then, the chunk merge unit 100 writes the remaining pixel data into this new chunk.

The processing from step S130 to step S170 is performed by the chunk flush controller 132 of the chunk merge unit 100. Condition determination as to whether a conflict occurs or not is performed by the value comparison circuit 136 and the AND circuit 138.

Then, the rasterizer 10 determines whether rasterization is completed (step S180). When the rasterization is not completed (step S180: No), the rasterizer 10 moves to the next stamp (step S190), and if a chunk containing a rasterization position after movement exists, this chunk is acquired (step S200). Then, the aforementioned processing from step S120 is repeated. The processing in step S200 is performed by the chunk data address calculator 130 of the chunk merge unit 100.

On the other hand, when it is determined in step S180 that the rasterization is completed (step S180: Yes), this processing is completed.

Figure 14:
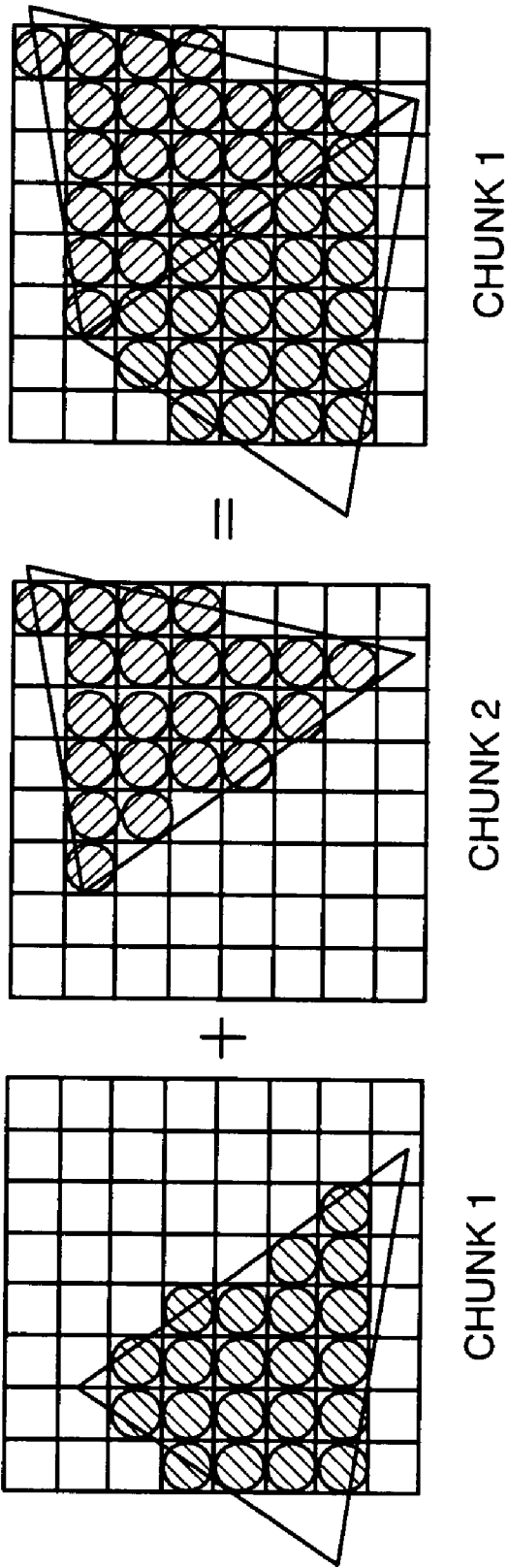
FIG. 14 is a diagram showing an example in which two polygons are merged in a case where conflict determination is performed on a pixel-by-pixel basis and chunks are merged on a stamp-by-stamp basis.
Figure 15:
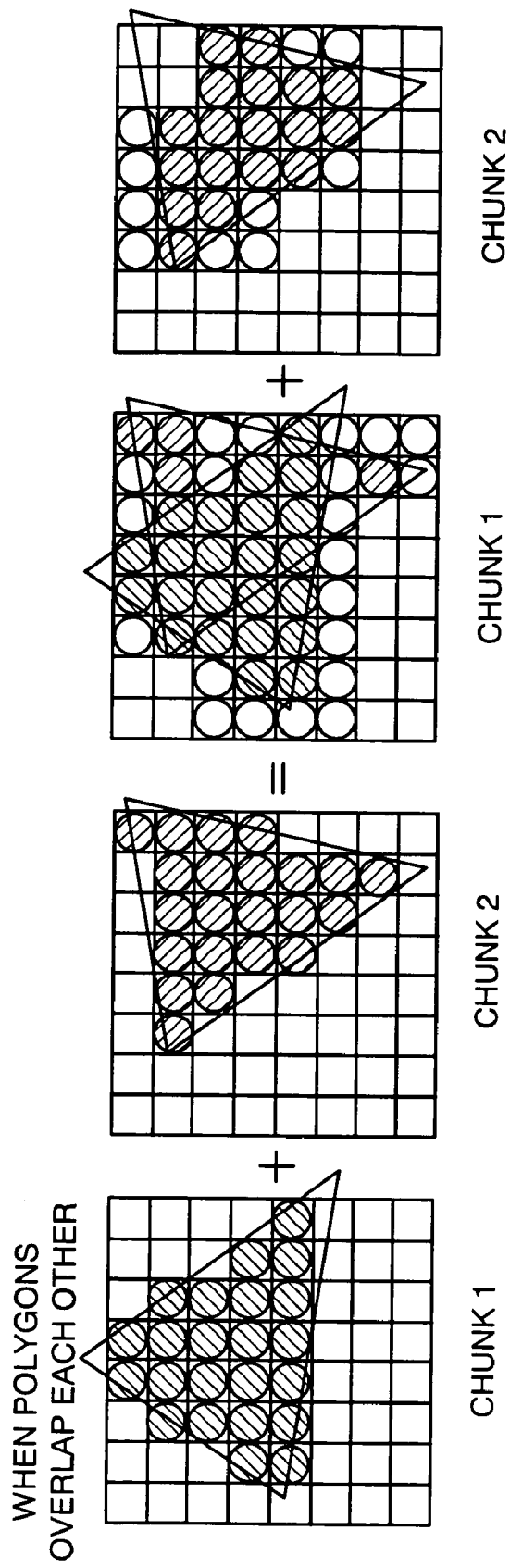
FIG. 15 is a diagram showing another example in which two polygons are merged in the case where conflict determination is performed on a pixel-by-pixel basis and chunks are merged on a stamp-by-stamp basis.

FIG. 14 and FIG. 15 are diagrams explaining the processing concept of merging chunks on a stamp-by-stamp basis. As described above, in this embodiment, one stamp is composed of 2×2=4 pixels. FIG. 14 is a diagram explaining a merger when polygons are arranged side by side in different chunks, and FIG. 15 is a diagram explaining a merger when polygons overlap each other in different chunks.

In the merging processing shown in FIG. 14 and FIG. 15, whether pixels in respective chunks conflict with each other is determined on a pixel-by-pixel basis and the chunks are merged on a stamp-by-stamp basis. In the example in FIG. 14, pixel data in the chunk 1 stored in the chunk data buffer 110 and pixel data in the chunk 2 inputted from the rasterizer 10 do not overlap on a pixel-by-pixel basis. Therefore, the pixel data formed from two polygons are merged into one chunk 1, and stored as one chunk 1 in the chunk data buffer 110. Accordingly, pixels of these two polygons are processed by one pixel processor 20.

On the other hand, in the example in FIG. 15, pixel data in the chunk 1 stored in the chunk data buffer 110 and pixel data in the chunk 2 inputted from the rasterizer 10 overlap each other on a pixel-by-pixel basis. Namely, these pixel data exist at the same X coordinate and Y coordinate. Therefore, only stamps, in which no pixel conflicts, out of stamps in the chunk 2 are added as new pixels (stamps) to the chunk. Namely, when any one of four pixels in one stamp conflicts with a pixel in the existing stamp, the four pixels are not added to the existing chunk. The remaining pixels (stamps) in the chunk 2 are written into pixels (stamps) in the new chunk 2. Accordingly, pixels of these two polygons are separately stored as two pieces of chunk data in the chunk buffer data 110 and separately processed by the pixel processors 20.

As compared with the merging method shown in FIG. 11 and FIG. 12, the merging method shown in FIG. 14 and FIG. 15 is the same in that the filling factor decreases slightly and the first derivative calculation with the next pixel differs according to a merger result.

Figure 16:
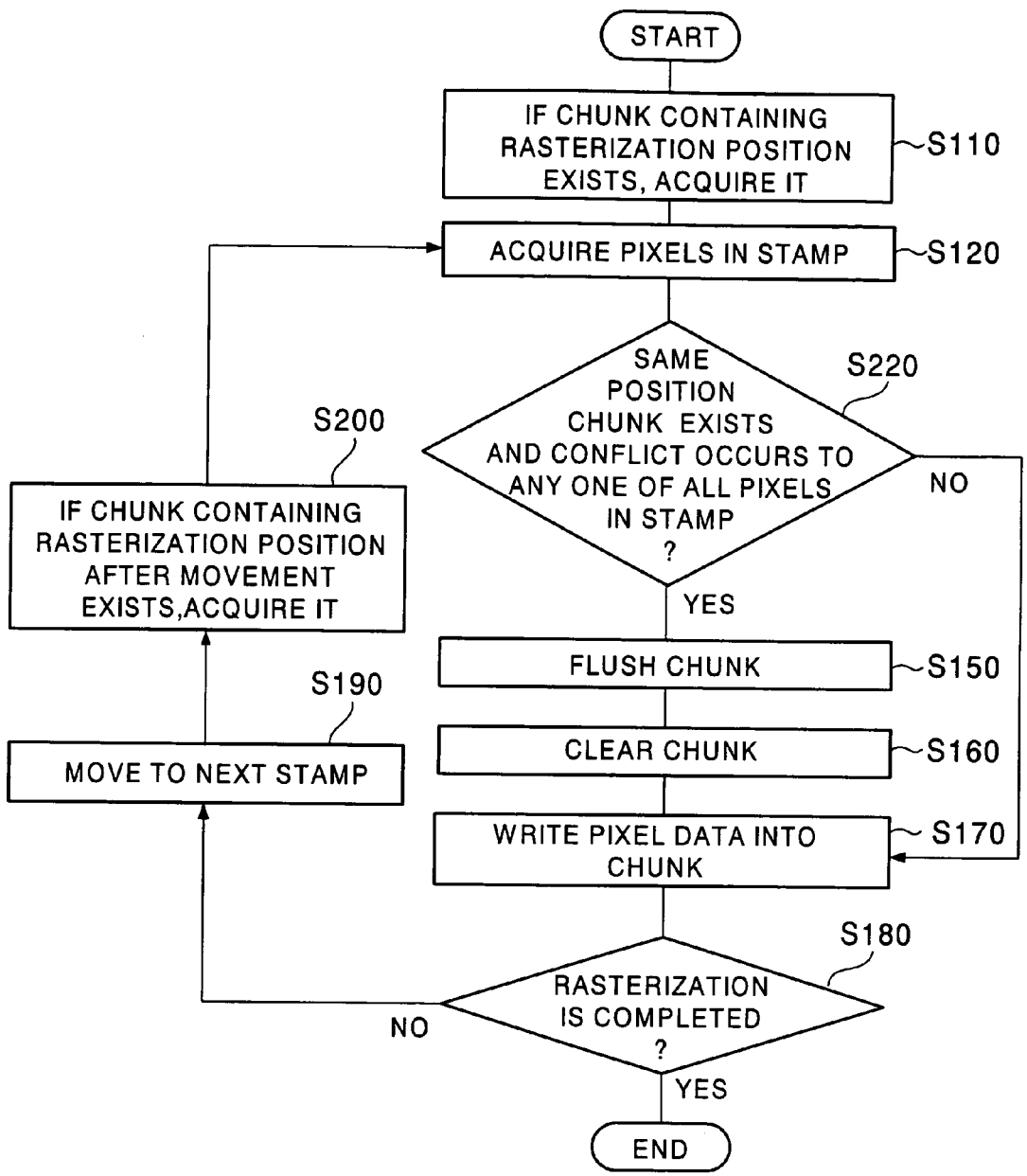
FIG. 16 is a flowchart explaining merging processing in the case where conflict determination is performed on a pixel-by-pixel basis and chunks are merged on a stamp-by-stamp basis.

FIG. 16 is a flowchart for explaining stamp-by-stamp merging processing such as shown in FIG. 14 and FIG. 15. The merging processing shown in FIG. 16 is different from the merging processing shown in FIG. 13 in step S220.

Namely, in the merging processing in FIG. 16, after step S120, it is determined whether a chunk in the same position exists and a conflict occurs to any one of all pixels in a stamp constituting the chunk (step S220). When no conflict occurs (step S220: No), the stamp is written as pixel data into the exiting chunk (step S170).

On the other hand, if a conflict occurs to any one of pixels in the stamp (step S220: Yes), the chunk is flushed (step S150) and cleared (step S160). Namely, all of four pixels in a stamp which are processed at the same time are written into the existing chunk data buffer 110 or written into a newly generated chunk.

Figure 17:
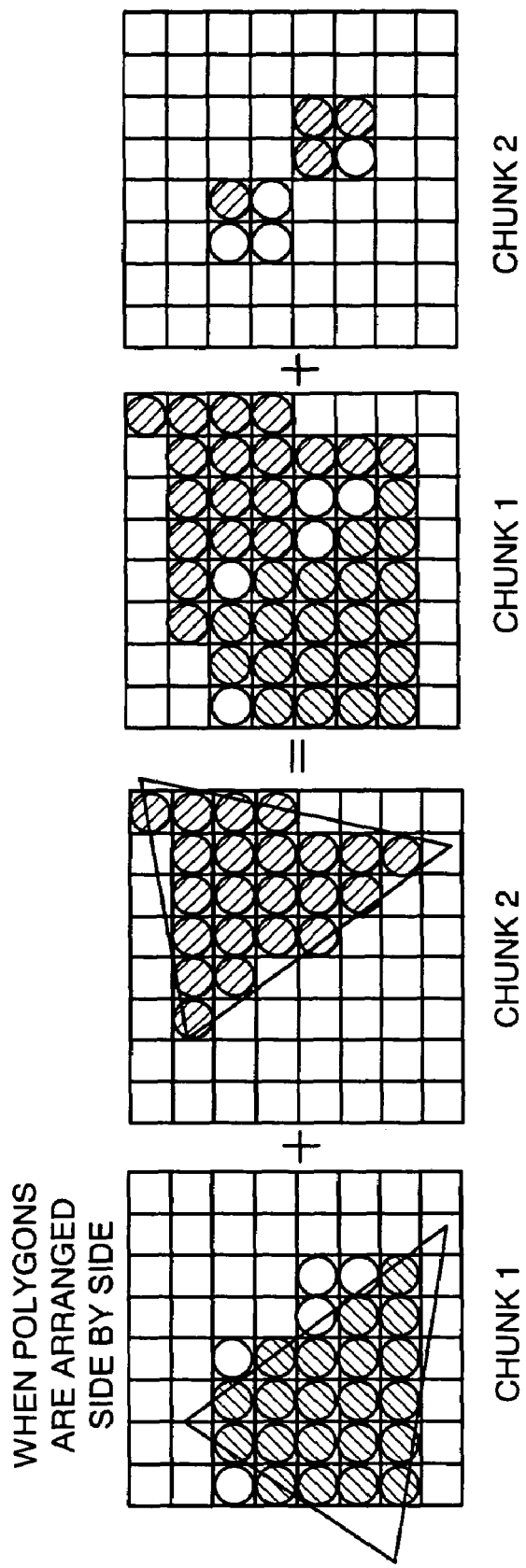
FIG. 17 is a diagram showing an example in which two polygons are merged in a case where conflict determination is performed on a stamp-by-stamp basis and chunks are merged on a stamp-by-stamp basis.
Figure 18:
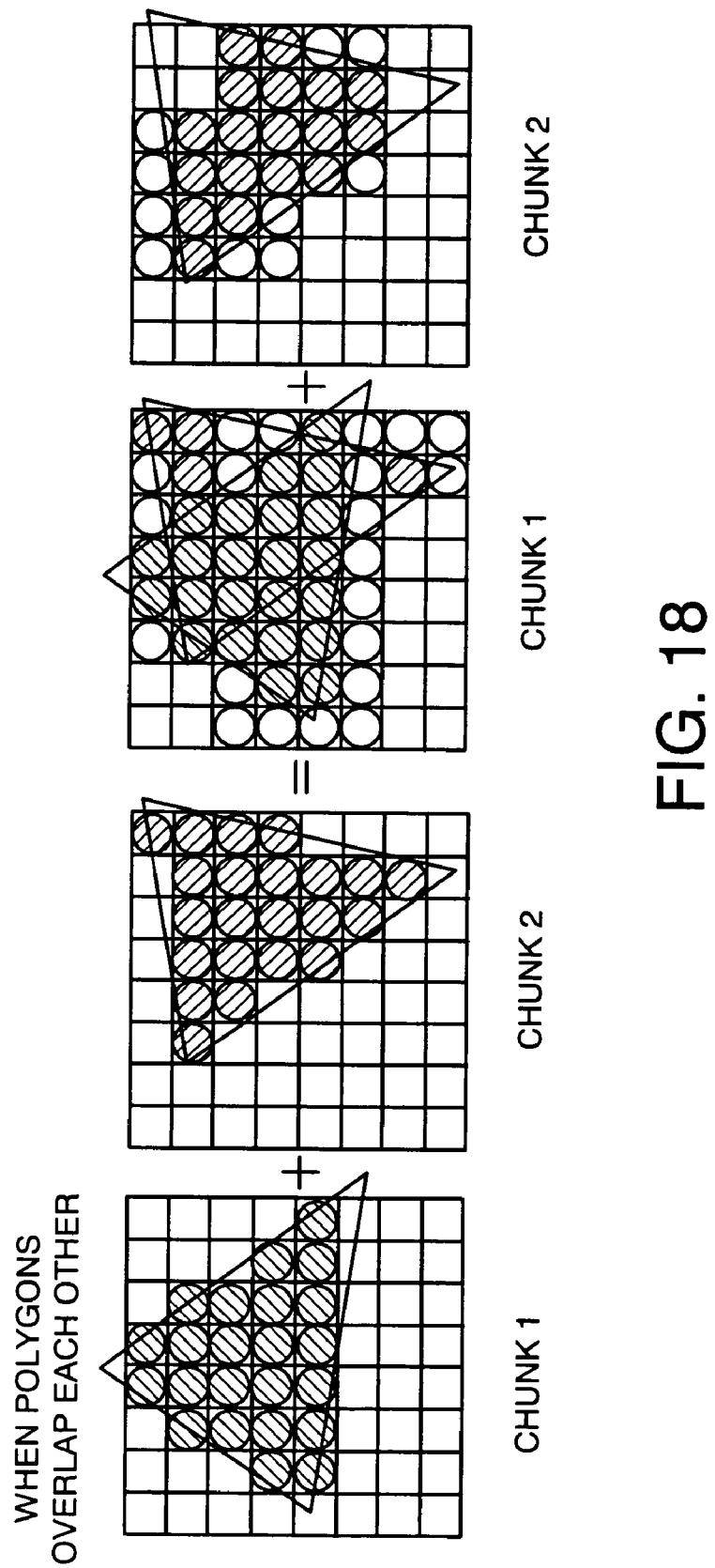
FIG. 18 is a diagram showing another example in which two polygons are merged in the case where conflict determination is performed on a stamp-by-stamp basis and chunks are merged on a stamp-by-stamp basis.

FIG. 17 and FIG. 18 are diagrams explaining the processing concept of performing conflict determination on a stamp-by-stamp basis and merging chunks on a stamp-by-stamp basis. FIG. 17 is a diagram explaining a merger when polygons are arranged side by side in different chunks, and FIG. 18 is a diagram explaining a merger when polygons overlap each other in different chunks.

In the merging processing shown in FIG. 17 and FIG. 18, whether pixels in respective chunks conflict with each other is determined on a stamp-by-stamp basis, and the chunks are merged on a stamp-by-stamp basis. In the example in FIG. 17, pixel data in the chunk 1 stored in the chunk data buffer 110 and pixel data in the chunk 2 inputted from the rasterizer 10 do not overlap each other on a pixel-by-pixel basis but overlap each other on a stamp-by-stamp basis.

Therefore, the pixel data formed from two polygons are merged into two chunk 1 and chunk 2. Accordingly, these two chunks are processed separately by the pixel processors 20.

Similarly, also in the example in FIG. 18, pixel data in the chunk 1 stored in the chunk data buffer 110 and pixel data in the chunk 2 inputted from the rasterizer 10 overlap each other on a stamp-by-stamp basis. Namely, when pixel data is already written in a stamp located in the same position, it is determined that stamps conflict with each other regardless of whether the same position pixel data actually exists.

Hence, only stamps, to which no conflict occurs, out of stamps in the chunk 2 are additionally written into the chunk 1. In other words, if pixel data is already written into the existing stamp located in the same position, a stamp in the same position is not added to the existing chunk. The remaining pixels (stamps) in the chunk 2 are written into the new chunk 2. Accordingly, pixels of these two polygons are separately stored as two pieces of chunk data in the chunk buffer data 110 and separately processed by the pixel processors 20.

In the merging method shown in FIG. 17 and FIG. 18, the filling factor decreases, but first derivative calculation with the next pixel is constant in a stamp, whereby a merging mechanism can be simplified. Namely, it can be determined whether stamps containing valid pixels inputted from the rasterizer 10 can be additionally written into the chunk data buffer 110 by only determining whether chunk data stored in the chunk data buffer 110 is valid or invalid on a stamp-by-stamp basis.

Figure 19:
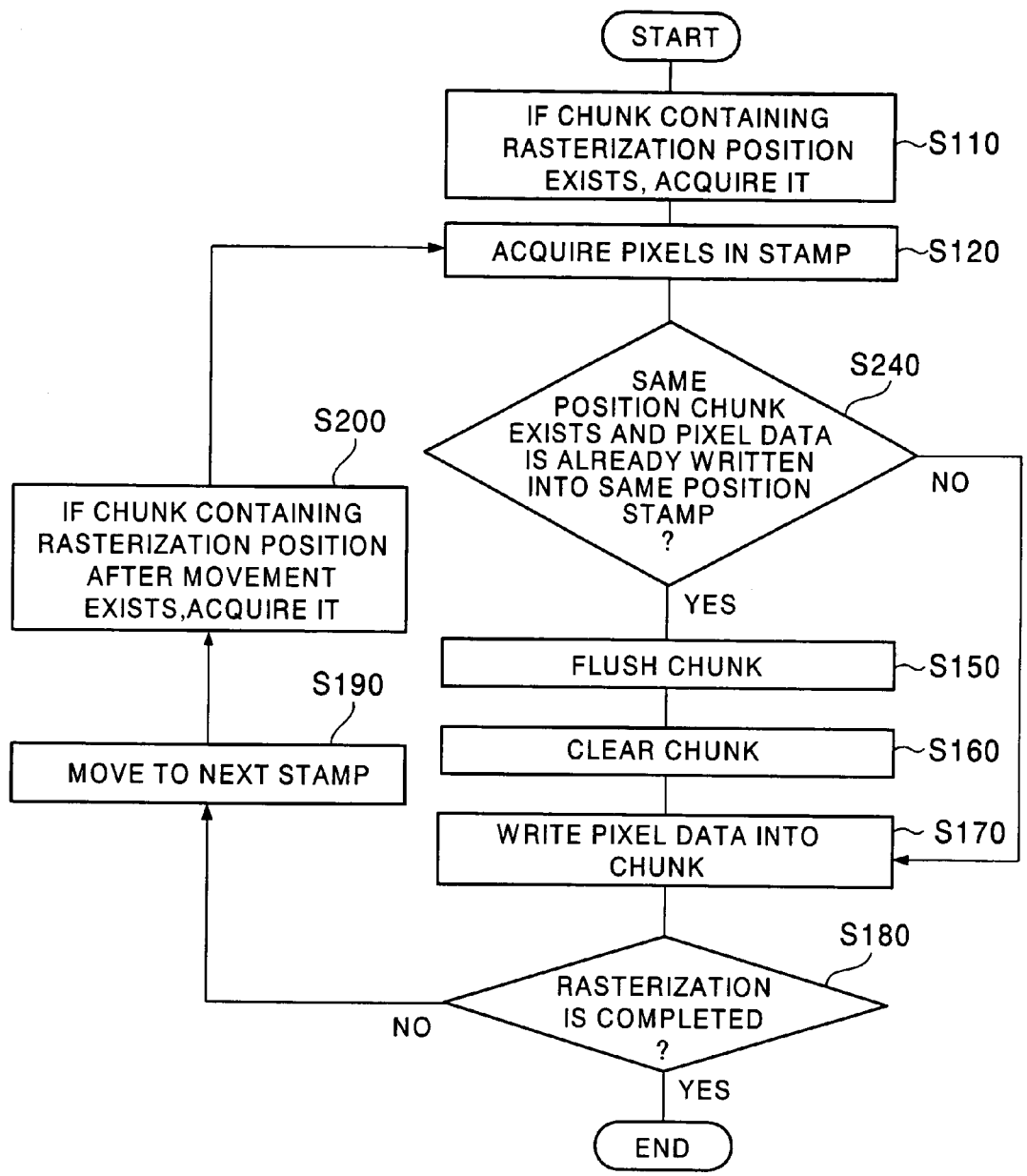
FIG. 19 is a flowchart explaining merging processing in the case where conflict determination is performed on a stamp-by-stamp basis and chunks are merged on a stamp-by-stamp basis.

FIG. 19 is a flowchart for explaining stamp-by-stamp merging processing such as shown in FIG. 17 and FIG. 18. The merging processing shown in FIG. 19 is different from the merging processing shown in FIG. 16 in step S240.

Namely, in the merging processing in FIG. 19, after step S120, it is determined whether a chunk in the same position exists and pixel data is already written into a stamp in the same position (step S240). When the pixel data is not written in the stamp in the same position (step S240: No), the stamp is written as pixel data into the exiting chunk (step S170).

On the other hand, if the pixel data is already written into the stamp in the same position (step S240: Yes), the chunk is flushed (step S150) and cleared (step S160). Then, pixel data in the stamp is written into the new chunk.

Incidentally, it is defined that in the merger of chunks hitherto explained by means of FIG. 11 to FIG. 19, a depth of each pixel is not taken into account. Namely, the chunk merge unit 100 which carries out the merger from FIG. 11 to FIG. 19 is regarded as not including a depth test function or as being used when a polygon such as a translucent polygon incapable of a depth test is rendered.

Figure 20:
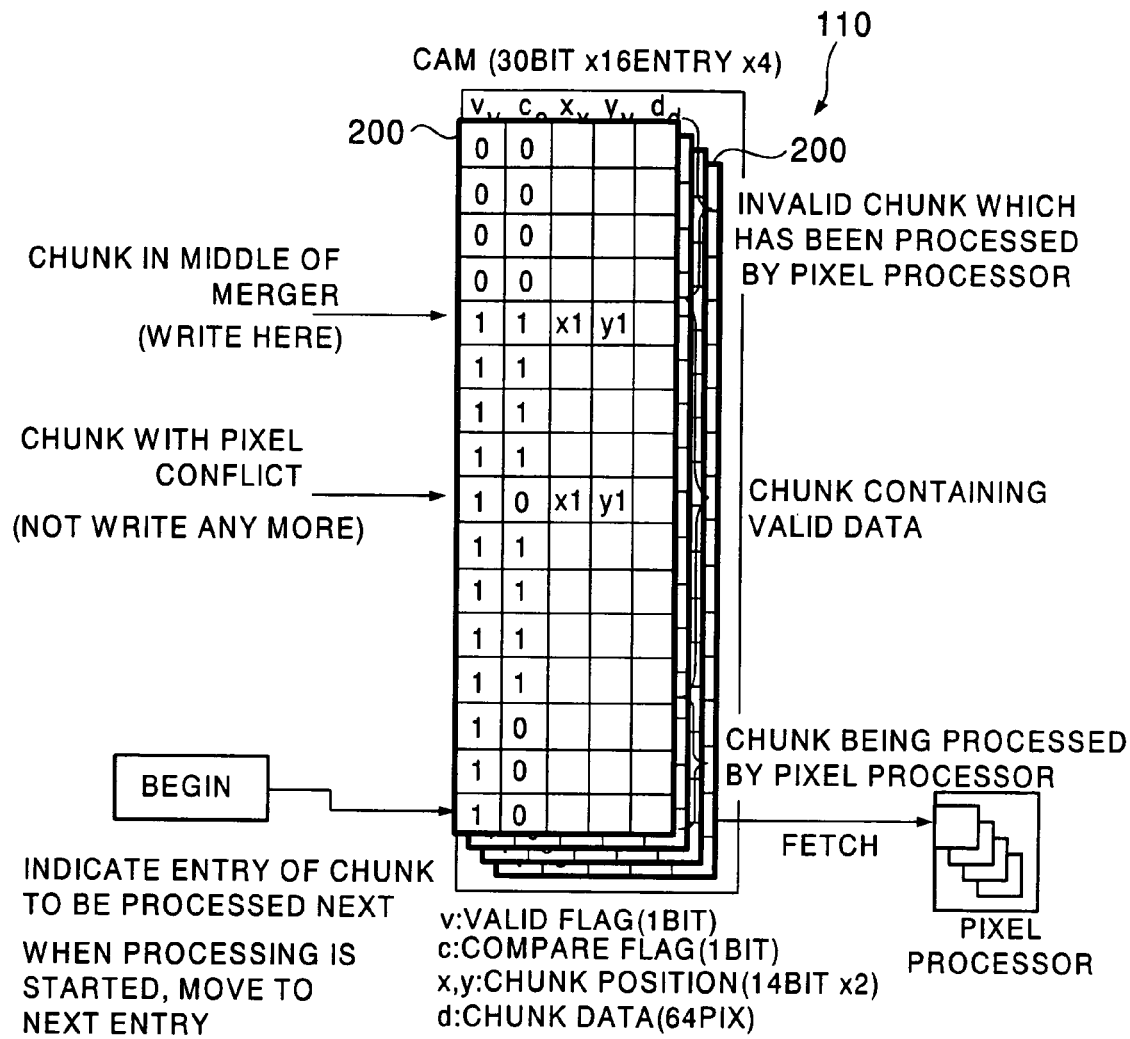
FIG. 20 is a block diagram explaining a chunk data store/read mechanism according to this embodiment.

FIG. 20 is a diagram showing an example of a store/read mechanism which allows the chunk merge unit 100 to read chunk data from the chunk data buffer 110 and allows the pixel processor 20 to acquire the chunk data from the chunk data buffer 110. In the example in FIG. 20, the store/read mechanism is composed of plural merge data buffers 200. A valid flag v, a compare flag c, and chunk positions x and y of the merge data buffer 200 are formed by the chunk data address calculator 130 of the chunk merge unit 100. Chunk data d indicates a storage region of chunk data in the chunk data buffer 100.

Entries of the chunk data buffer 110 are classified into chunks which are being processed by the pixel processors 20, valid chunks which are waiting for processing by the pixel processors 20, and invalid chunks which have been processed by the pixel processors 20.

The valid flag v indicates whether valid chunk data is stored in each entry of the merge data buffer 200. The example in FIG. 20 shows that the entry is valid when the valid flag v is 1, and that the entry is invalid when the valid flag v is 0.

The compare flag c indicates whether the entry is a chunk to be compared by the chunk merge unit 100. In the example in FIG. 20, when the compare flag c is 1, the chunk merge unit 100 compares a chunk of the entry with a chunk inputted from the rasterizer 10, and when the compare flag c is 0, it does not make a comparison. When the chunk merge unit 100 newly writes an entry, the compare flag c is turned on and set to 1. When a conflict occurs at the time of a write, the compare flag c of the entry is turned off and set to 0. Namely, as concerns a chunk which has been merged, its compare flags c is 0. Also as concerns an entry whose processing is started by the pixel processor 20, its compare flag c is set to 0. Consequently, false overwriting in a chunk, which is in the middle of processing, by the chunk merge unit 100 can be avoided.

The chunk positions x and y hold X and Y coordinates (position information) of a chunk. In the example in FIG. 20, the chunk positions x and y are each 14-bit information. The chunk merge unit 100 can determine from these chunk positions x and y whether a chunk in the same position exists in the chunk data buffer 110.

The chunk data d is 8×8=64 pixel information. Namely, the chunk data d is concrete pixel data on the entry.

The chunk merge unit 100 designates these valid flag v, compare flag c, and chunk positions x and y to access the chunk data buffer 110. In the case of a hit, the chunk merge unit 100 can acquire the chunk data d, but in the case of an unhit, no chunk data exists, and hence a chunk is newly generated.

A begin pointer begin is a pointer which indicates an entry of chunk data to be processed next. Accordingly, the pixel processor 20 fetches chunk data from an entry indicated by the begin pointer begin and processes it. When processing by the pixel processor 20 is started, the begin pointer begin is moved to the next entry.

As concerns an entry whose processing is started, the pixel processor 20 sets the compare flag c to 0. Moreover, as concerns an entry whose processing is completed, the pixel processor 20 sets the valid flag v to 0.

Figure 21:
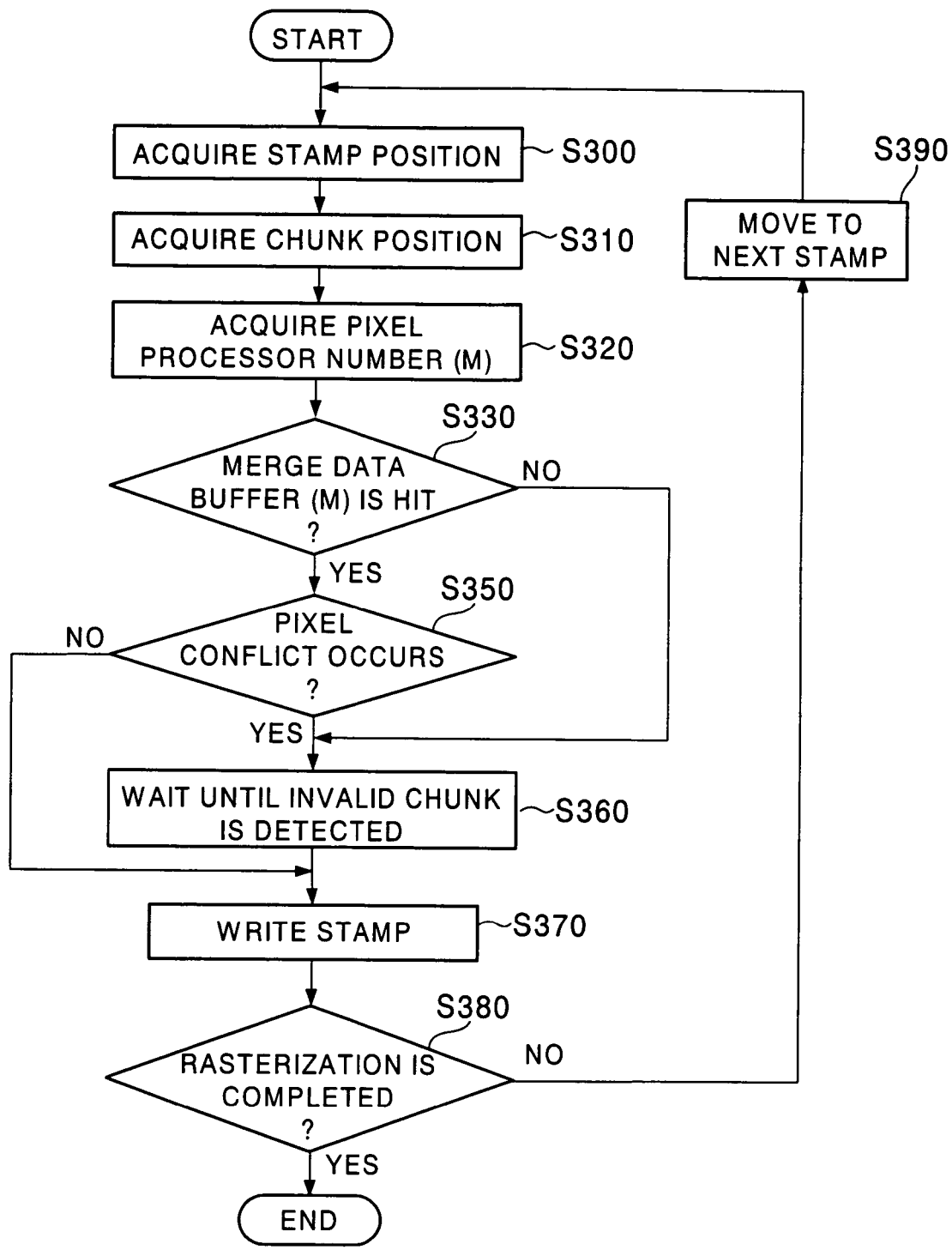
FIG. 21 is a flowchart explaining processing in the store/read mechanism in FIG. 20.

FIG. 21 is a flowchart explaining the processing contents of the store/read mechanism shown in FIG. 20. As shown in FIG. 21, a stamp position is first acquired (step S300). A chunk position is then acquired (step S310).

Next, a pixel processor number (M) is acquired. This pixel processor number (M) is information for specifying which of plural pixel processors 20 performs processing. By specifying the pixel processor 20 which performs processing, the chunk merge unit 100 which performs a merger of chunks is specified. The processing in step S300, step S310, and step S320 are carried out by the rasterizer 10.

Thereafter, the specified chunk merge unit 100 searches the merge data buffer 200 and determines whether a chunk which is an object to be processed at present exists in the chunk data buffer 110 (step S330).

When the chunk as the object to be processed exists in the merge data buffer 200 (step S330: Yes), it is determined whether a conflict occurs between pixels. (step S350).

When no conflict occurs between pixels (step S350: No), a stamp inputted from the rasterizer 10 is written into the chunk data d of the merge data buffer 200 (step S370).

When it is determined in step S350 that a conflict occurs between pixels (step S350: Yes) or when it is determined in the aforementioned step S330 that the chunk as the object to be processed does not exist in the merge data buffer 200 (step S330: No), the chunk merge unit 100 waits until an invalid chunk is detected (step S360). In other words, it waits until a chunk which allows a new write is detected. Then, a stamp is written into the new chunk (step S370).

The processing in step S 330, step S350, step S360, and step S370 is carried out by the chunk merge unit 100.

After step S370, it is determined whether rasterization is completed (step S380). When the rasterization is not completed (step S380: No), a movement to the next stamp is carried out (step S390), and the aforementioned processing from step S300 is repeated.

On the other hand, when the rastization is completed (step S380: Yes), this processing is completed. The processing in step S380 and step S390 is carried out by the rasterizer 10.

Figure 22:
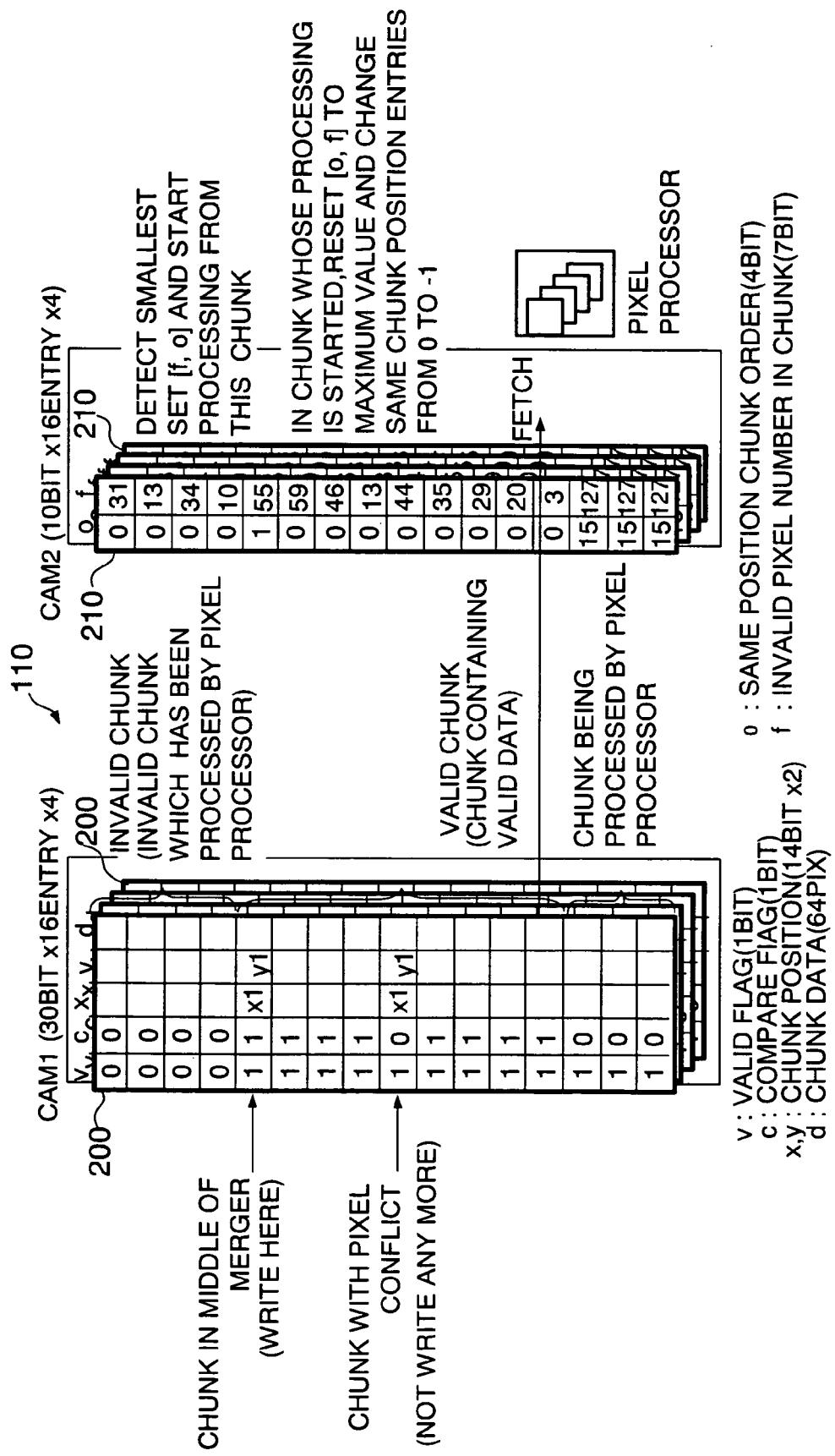
FIG. 22 is a block diagram explaining another chunk data store/read mechanism according to this embodiment.

FIG. 22 is a diagram showing the configuration of a modification of the store/read mechanism. The store/read mechanism shown in FIG. 22 is configured by adding a merge status buffer 210 to the merge data buffer 200.

The merge status buffer 210 includes a same position chunk order o and an invalid pixel number in chunk f. The same position chunk order o is information which, when plural chunks in the same position exist in the chunk data buffer 110, is used to specify their generation order. Namely, when only one chunk exists in a certain position, the same position chunk order o is 0, and when two chunks exist, the same position chunk order o of the chunk generated first is 0, and the same position chunk order o of the chunk generated secondly is 1. Hereinafter, similarly to the above, every time a chunk in the same position is generated, the value of the same position chunk order o increases by one. However, the same position chunk order o of the entry which is being processed by the pixel processor 20 is stored with 15 which is the maximum value.

The invalid pixel number in chunk f is information indicating how many invalid pixels exist in chunk data in the entry. In this embodiment, the possible values of the invalid pixel number in chunk f are 0 to 64. However, the invalid pixel number in chunk f in the entry being processed by the pixel processor 20 is stored with 127 which is the maximum value.

Moreover, in the chunk data buffer 110 shown in FIG. 22, the begin pointer begin which indicates an entry to be processed next by the pixel processor 20 does not exist. When the pixel processor 20 tries to acquire chunk data from the chunk data buffer 110, it selects an entry with the smallest invalid pixel number in chunk f and starts processing from this entry. In the example in FIG. 22, the smallest invalid pixel number in chunk f is 3, and therefore the pixel processor 20 acquires chunk data from this entry and processes it.

When plural same position chunks exist, an entry with the smallest same position chunk order o is selected. Consequently, processing in the pixel processor 20 is performed in the order in which chunk data is generated.

As concerns an entry whose processing is started by the pixel processor 20, the compare flag c is set to 0, and the same position chunk order o and the invalid pixel number in chunk f are each set to the maximum value. Moreover, one is subtracted from all values of the same position chunk order o of the same position chunks. When processing in the pixel processor 20 is completed, the valid flag v is set to 0.

It should be noted that the merging processing of the chunk data buffer 110 shown in FIG. 22 is the same as that in FIG. 21. However, the process for deciding an entry from which the processing is started by the pixel processor 20 is different from that in FIG. 21.

Figure 23:
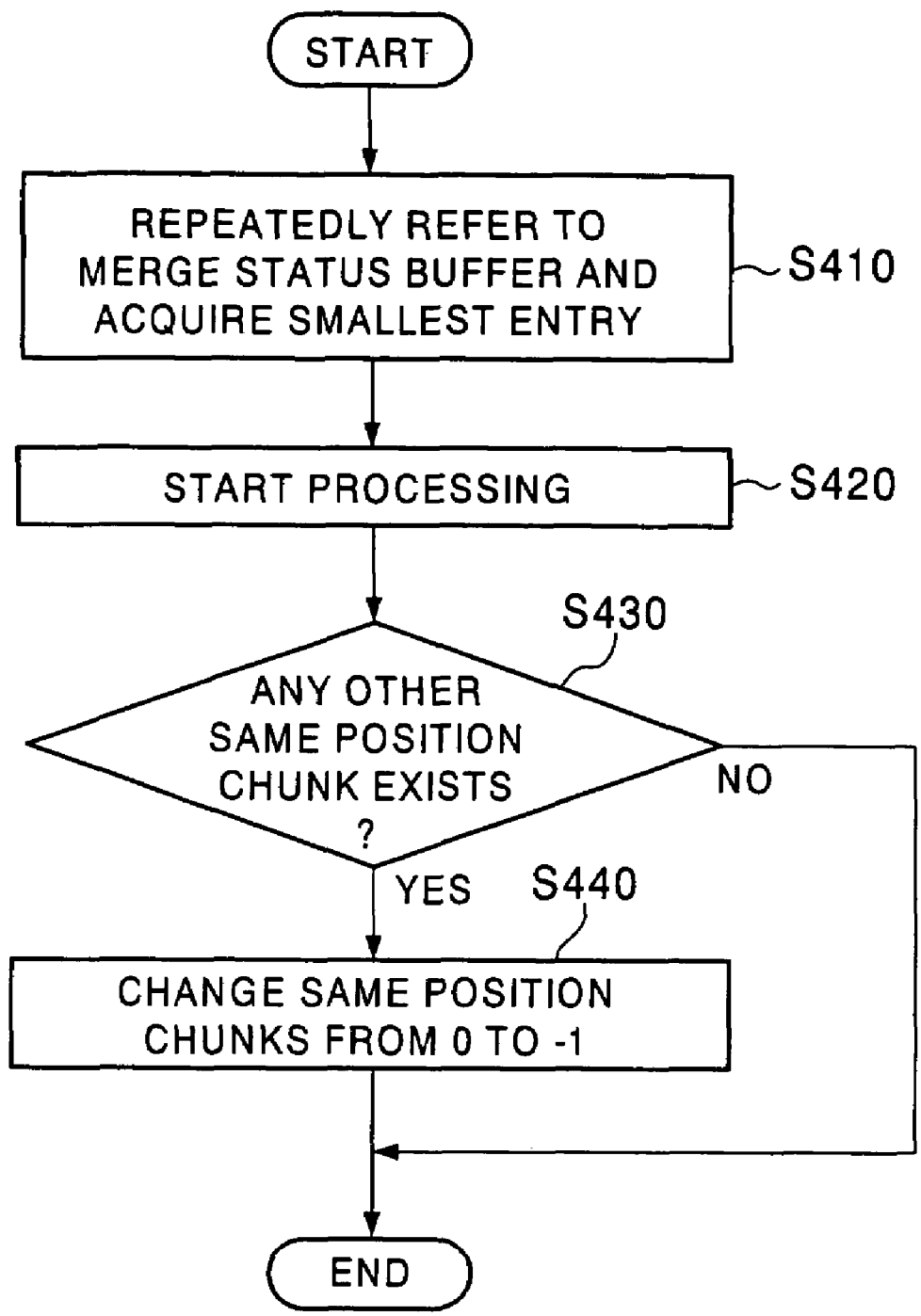
FIG. 23 is a flowchart explaining the process for deciding an entry from which processing is started by the pixel processor in the store/read mechanism in FIG. 22.

FIG. 23 is a flowchart explaining the process for deciding the entry from which the processing is started by the pixel processor 20.

As shown in FIG. 23, the pixel processor 20 repeatedly refers to respective entries in the merge status buffer 210, selects an entry with the smallest invalid pixel number in chunk f and the smallest same position chunk order o, and acquires the chunk data d in this entry (Step S410). Then, it starts to process the acquired chunk data d (Step S420).

Next, it is determined whether any other same position chunk exists in the chunk data buffer 110 (step S430). If no other same position chunk exists (Step S430: No), this processing is completed.

On the other hand, if other same position chunks exist, one is subtracted from the values of the same position chunk order o of all the same position chunks (step S440). Then, this processing is completed.

Figure 24:
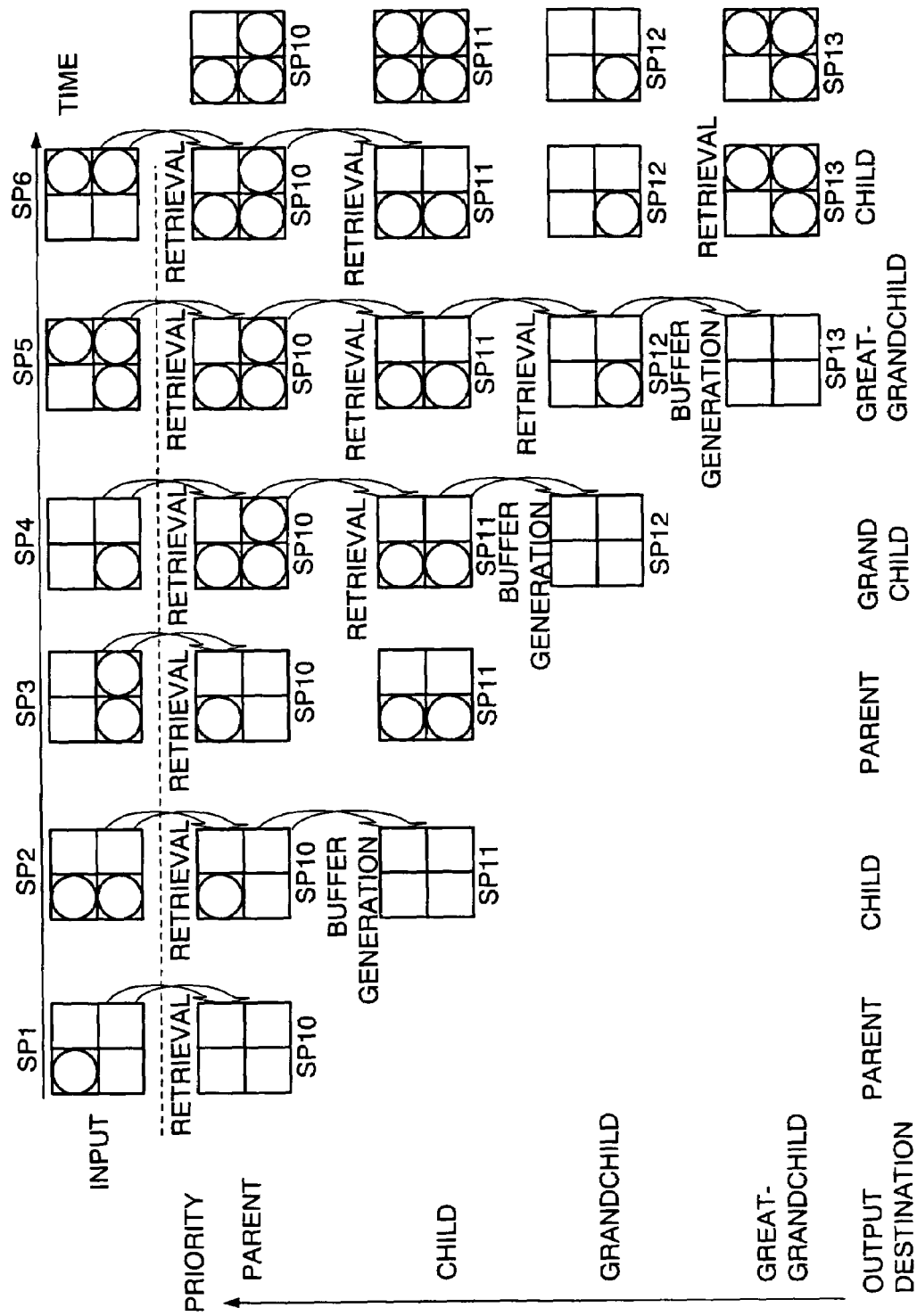
FIG. 24 is a diagram explaining conflict determination of stamps when plural same position stamps exist.

FIG. 24 is a diagram explaining a merging processing concept different from those described above. A box of 2×2 represents a stamp. It is assumed here that stamps SP1 to SP6 are inputted in this order in time sequence.

At a point in time when the stamp SP1 is inputted, a new stamp SP10 (parent stamp) is generated, and pixel data is stored therein. Subsequently, the stamp SP2 is inputted, but pixel data in this stamp SP2 conflicts with the pixel data in the existing stamp SP10, and hence a new stamp SP11 (child stamp) is generated, and the pixel data is stored therein.

Thereafter, the stamp SP3 is inputted, and since pixel data in this stamp SP3 does not conflict with the pixel data in the first stamp SP10, it is stored in the stamp SP10.

Then, the stamp SP4 is inputted, but pixel data in this stamp SP4 conflicts with both the pixel data in the existing stamp SP10 and stamp SP11, whereby a new stamp SP12 (grandchild stamp) is generated, and the pixel data is stored therein.

Thereafter, the stamp SP5 is inputted, but pixel data in this stamp SP5 conflicts with all the pixel data in the existing stamp SP10, stamp SP11, and stamp SP12, and hence a new stamp SP13 (great-grandchild stamp) is generated, and the pixel data is stored therein.

Subsequently, the stamp SP6 is inputted, and since pixel data in this stamp SP6 does not conflict with the pixel data in the existing stamp SP11, it is stored in the stamp SP11.

As described above, in the example in FIG. 24, when plural existing stamps exist in the same position, a stamp in which no conflict occurs is found from the existing stamps.

Figure 25:
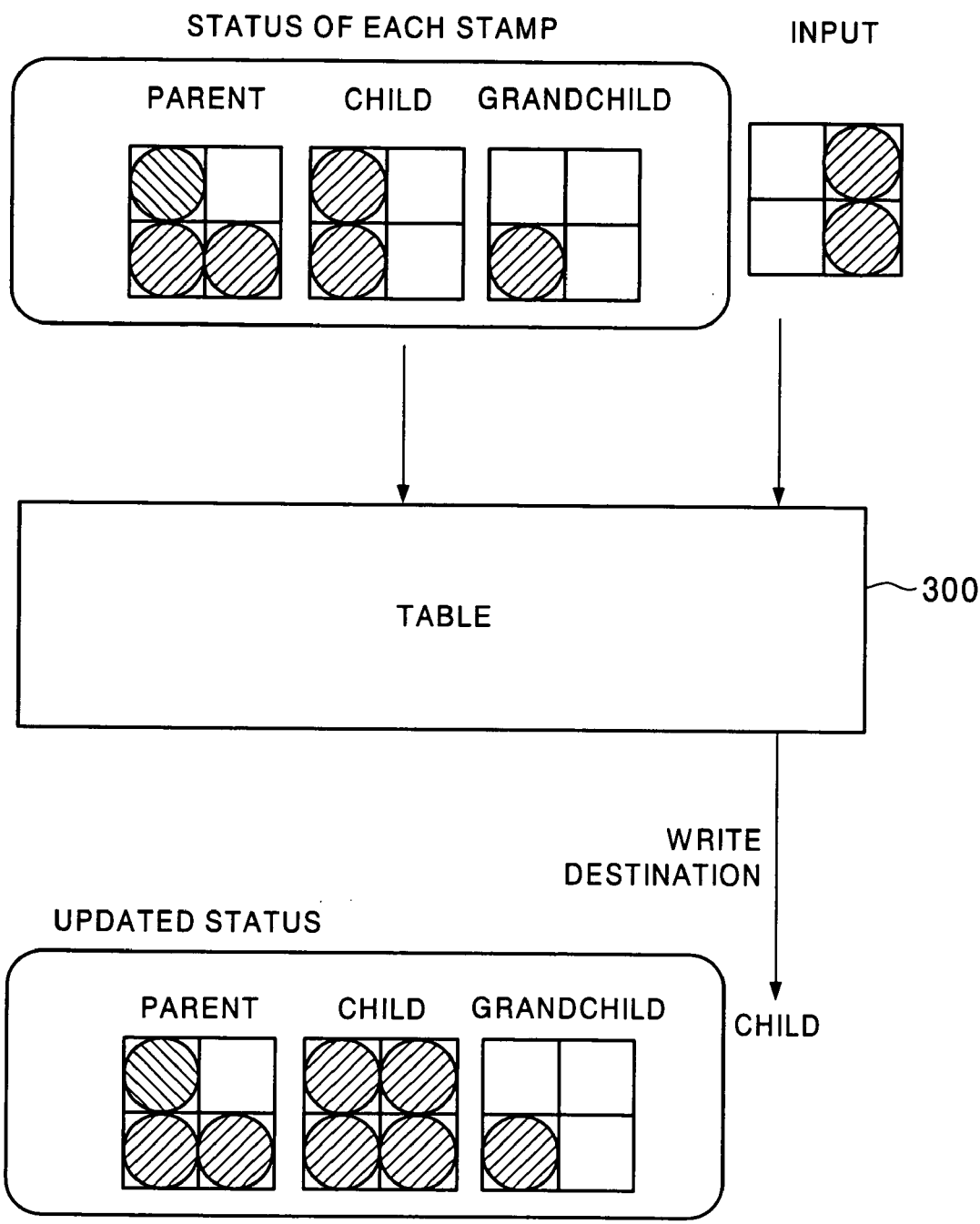
FIG. 25 is a diagram explaining the processing concept of specifying a stamp, in which pixel data is stored, by using a table.

FIG. 25 is a diagram explaining a method for determining in which existing stamp pixel data in an inputted stamp is stored by using a table 300. In FIG. 25, existing stamps (in this example, a parent stamp, a child stamp, and a grandchild stamp) and a newly inputted stamp are inputted to the table 300. The table 300 outputs to which stamp the newly inputted stamp is to be written based on the inputted stamps and information stored in the table 300. In this example, the newly inputted stamp can be written into the child stamp, and this information is outputted.

As shown in FIG. 26, in the table 300, output destinations corresponding to all patterns of pixel data stored in parent stamps, child stamps, grandchild stamps, and great-grandchild stamps respectively and all patterns of pixel data stored in a newly inputted stamp are stored.

Figure 27:
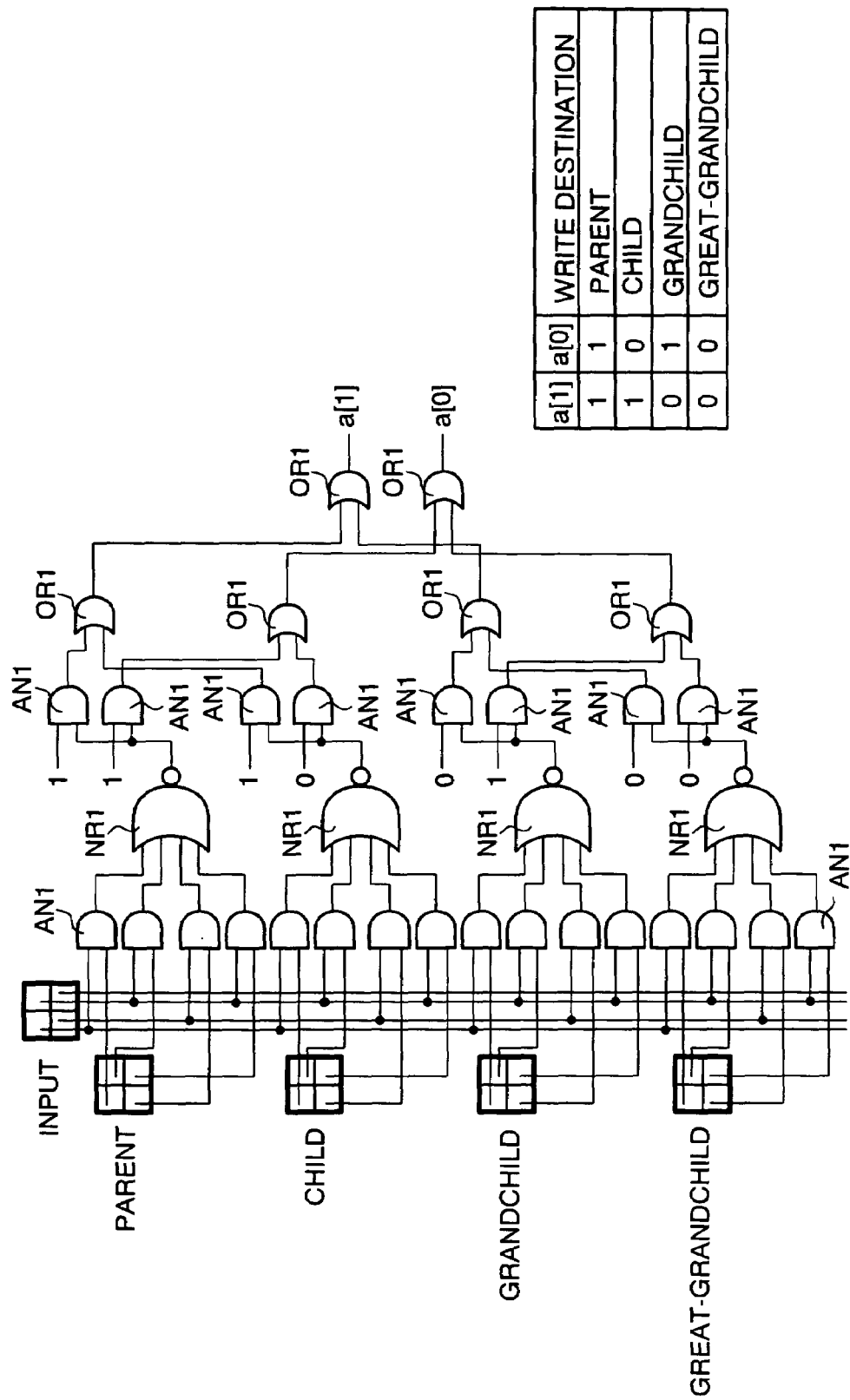
FIG. 27 is a diagram showing an example explaining a logic circuit in a case where a stamp to be stored is specified by using the logic circuit.

FIG. 27 is a diagram showing an example when determination in the table 300 is configured by a logic circuit. As shown in FIG. 27, this logic circuit is configured by combining AND circuits AN1, NOR circuits NR1, and OR circuits OR1 as shown in illustration.

In each stamp, 1 indicates a case where pixel data exists, and 0 indicates a case where no pixel exists. By inputting position information on pixel data in a newly inputted stamp, a parent stamp, a child stamp, a grandchild stamp, and a great-grandchild stamp, a 2-bit operation result a[1], a[0] is inputted.

When the operation result a[1], a[0] is 1, 1, this means that the write destination is a parent stamp; when the operation result a[1], a[0] is 1, 0, this means that the write destination is a child stamp; when the operation result a[1], a[0] is 0, 1, this means that the write destination is a grandchild stamp; and when the operation result a[1], a[0] is 0, 0, this means that the write destination is a great-grandchild stamp.

Figure 28:
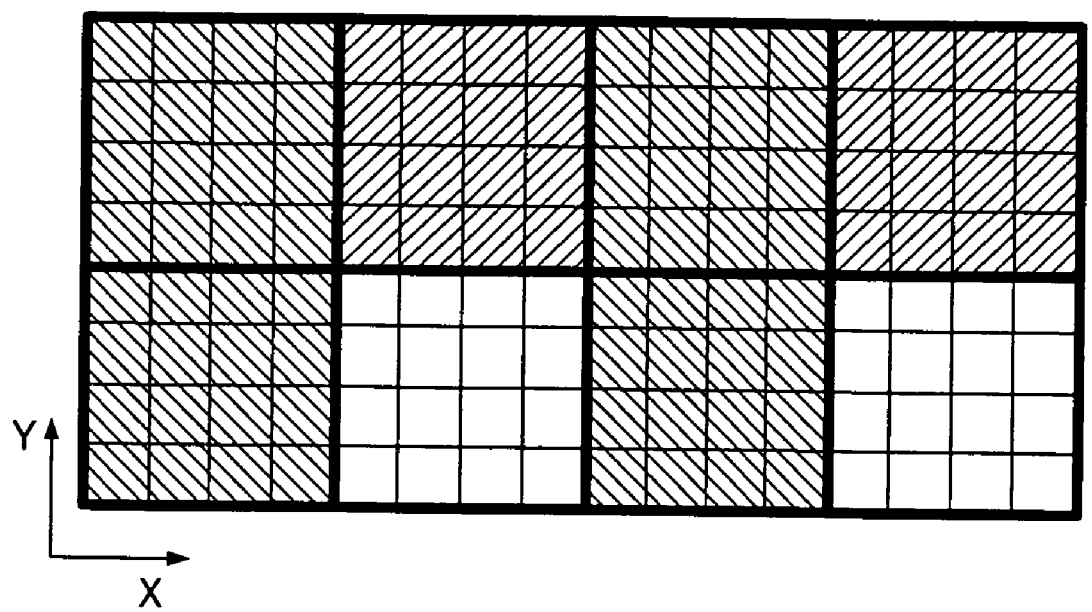
FIG. 28 is a diagram explaining an example in which a chunk is composed of pixels which are located adjacent to each other in a rectangular shape.

FIG. 28 shows an example in which a chunk is composed in the form of a block similarly to the above description. In FIG. 28, one chunk is composed of 4×4=16 pixels. Hence, FIG. 28 shows eight chunks. If a chunk is composed of pixels which are located adjacent to each other in a rectangular shape, an operation between adjacent pixels is facilitated.

FIG. 29 shows an example in which a chunk is composed in the form of interleave. In FIG. 29, one unit is composed of 8×8=64 pixels. Pixels located in "1" in one unit are defined as one chunk; pixels located in "2" in one unit are defined as one chunk; pixels located in "3" in one unit are defined as one chunk; and pixels located in "4" in one unit are defined as one chunk. Namely, a chunk is defined as a set of pixels located apart from each other.

Assuming that four pixel processors 20 exist here, the four pixel processors can process four chunks discretely. Namely, according to an aspect in FIG. 29, load distribution among the pixel processors 20 becomes easy.

Figure 30:
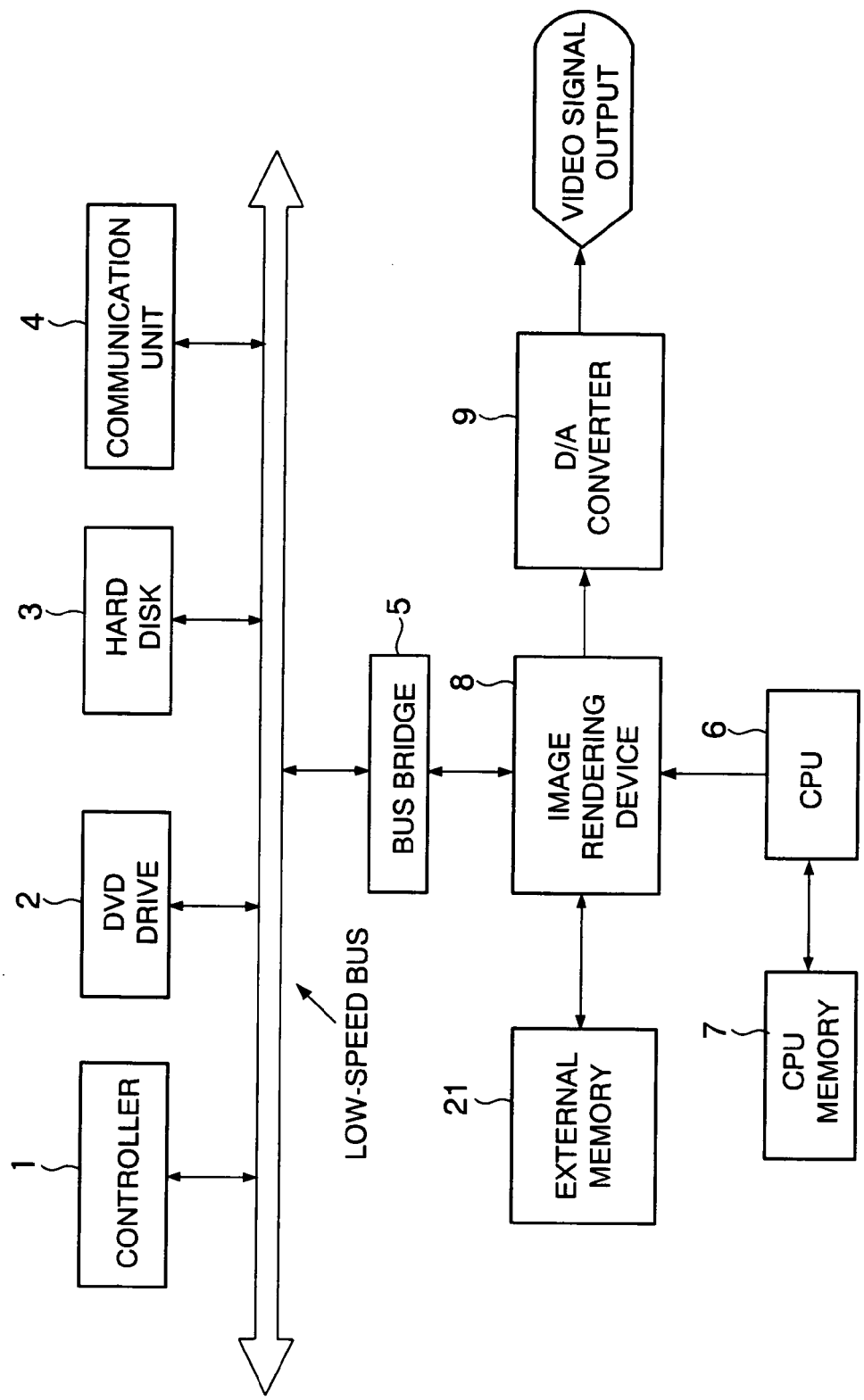
FIG. 30 is a diagram showing an example of the hardware configuration of a real-time three-dimensional graphics system equipped with the image rendering device according to this embodiment.

This embodiment is used for a real-time three-dimensional graphics system such as a game machine shown in FIG. 30. A controller 1, a DVD drive 2, a hard disk drive 3, and a communication unit 4 are connected to a low-speed bus, and an image rendering device 8 is also connected thereto via a bus bridge 5. An external memory 21 and a CPU 6 are connected to the image rendering device 8.

Application software for a game or the like is stored in a medium (DVD) which is set in the DVD drive 2. This application software is executed by means of a CPU memory 7 by the CPU 6, and three-dimensional spatial data is updated by the performance of various kinds of processing in response to user manipulation inputted from the controller 1. Consequently, polygon data is transmitted from the CPU 6 to the image rendering device 8, and image rendering such as described above is performed.

Specifically, the CPU 6 acquires vertex data to render objects from the CPU memory 7, and the CPU 6 performs the geometry processing. The result of the geometry processing is transferred to the image rendering device 8. The image rendering device 8 performs the rasterization processing thereto, transmits a completion notice to the CPU 6 when the rasterization processing is competed and waits for the next data from the CPU 6. By repeating such processing, the rendering processing is executed.

Vertex data includes various information such as coordinates of vertexes, colors, texture data, normal vectors and so on, and then the CPU 6 executes necessary operation.

Image data as a rendering result outputted from the image rendering device 8 becomes a video signal output through a D/A converter 9, and it is transmitted to a display not shown and displayed. The display may be a dedicated display, or may be a display of a TV set, a computer, or the like. A viewing area on a display is called a screen.

Figure 31:
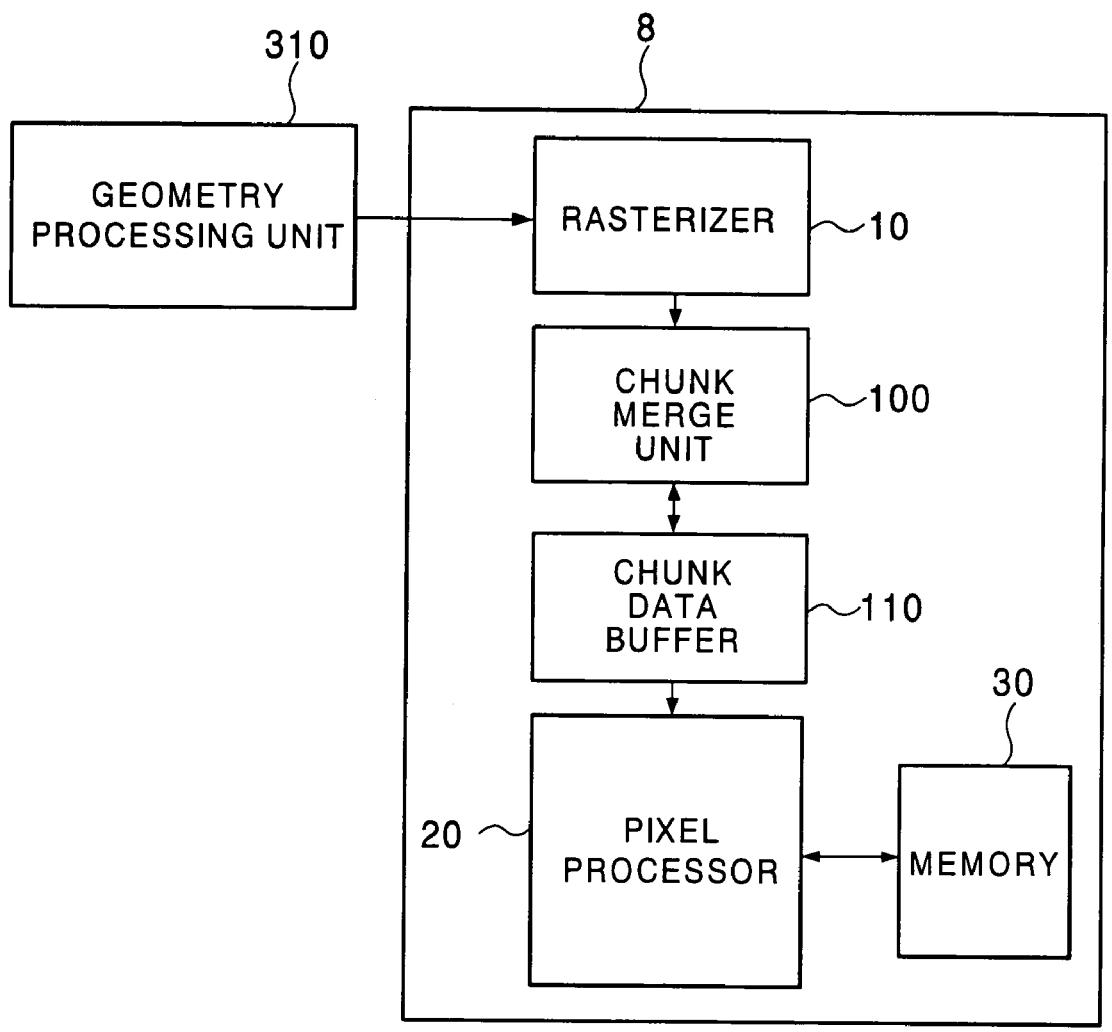
FIG. 31 is a block diagram showing an example of the configuration of the image rendering device according to this embodiment.

FIG. 31 is a diagram showing an example of the image rendering device 8 according to this embodiment by means of a block. The configuration of the image rendering device 8 may be any one of FIG. 4, FIG. 5, FIG. 6, and FIG. 7. Data on a polygon is inputted to the rasterizer 10 of the image rendering device 8 from a geometry processing unit 310. The geometry processing unit 310 may be the CPU 6. In the example in FIG. 31, the memory 30 is provided inside the image rendering device 8.

Figure 32:
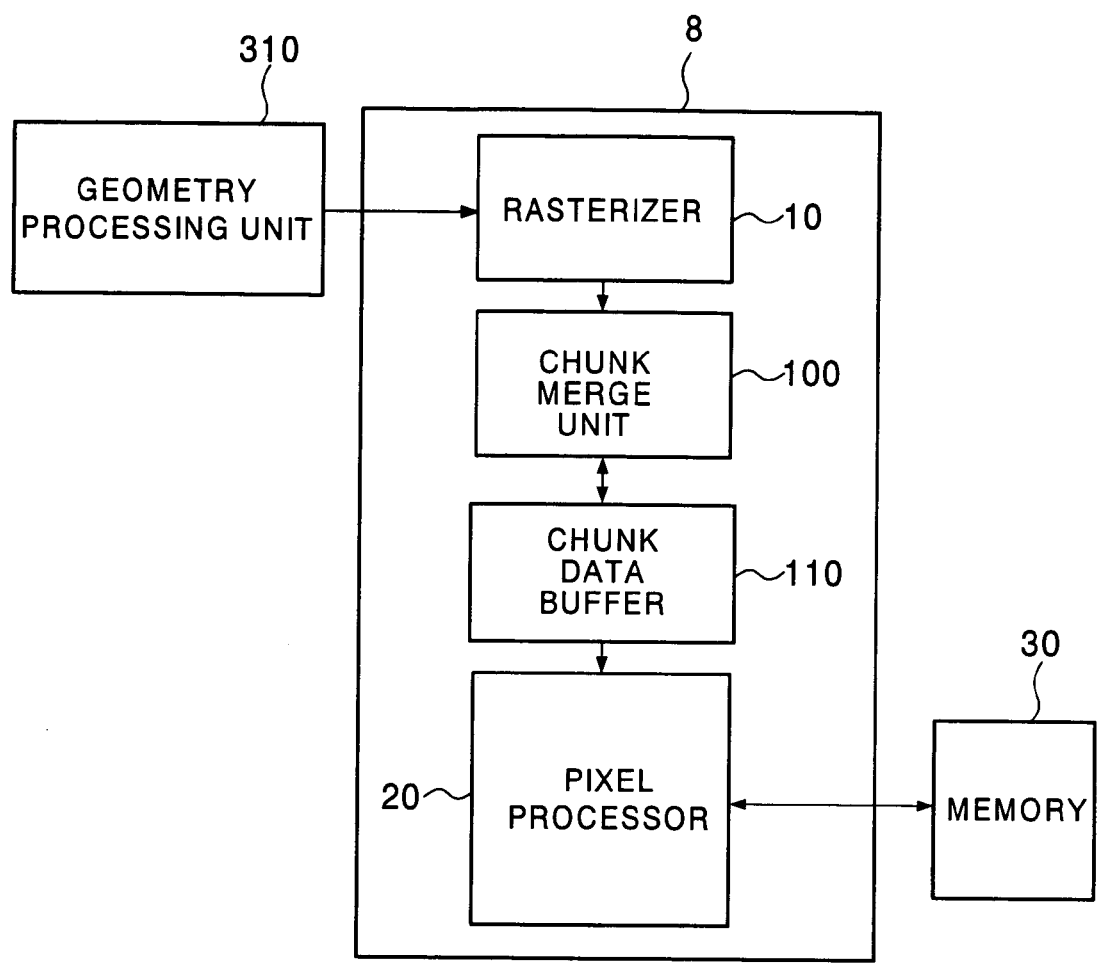
FIG. 32 is a block diagram showing another example of the configuration of the image rendering device according to this embodiment.

FIG. 32 shows a modification of the image rendering device 8, and the memory 30 is provided outside the image rendering device 8. Namely, the memory 30 may be provided inside or outside the image rendering device 8.

As described above, according to this embodiment, the process in which the pixel processor 20 determines whether to be a pixel position being processed at present or not can be omitted by guaranteeing that each pixel data is in a different pixel position.

Moreover, by integrating pixel data located adjacent to each other in a rectangular shape as a chunk, locality can be improved, and the efficiency of reading texture data and the like can be improved.

Further, by collectively processing pixel data located apart from each other as a chunk, load distribution among the pixel processors 20 can be facilitated.

Furthermore, the pixel processor 20 can acquire chunk data in sequence from the chunk data buffer 110 and process it in sequence. In particular, since plural pixel processors 20 are provided, the plural pixel processors 20 can respectively process chunk data, whereby the activity ratio of the pixel processor 20 can be increased.

In addition, the chunk merge unit 100 merges plural chunks whose pixel data do not conflict with each other into one chunk, and hence the number of chunks processed by the pixel processor 20 can be reduced.

Besides, the concept of a "stamp" composed of pixel data of two or more pixels square is introduced, and the processing of merging chunks is performed on a stamp-by-stamp basis, whereby a neighborhood calculation becomes possible. For example, a first derivative value can be found from a difference from neighborhood pixel data.

Moreover, since plural chunk data buffers 110 are provided, even when the processing of some polygon gets out of the region of one chunk data buffer 110, chunk data can be held until the processing of another polygon enters again the region of the chunk data buffer 110.

Further, if the coordinate position of a chunk stored in the chunk data buffer 110 is fixed, wiring from the chunk data buffer 110 to the pixel processor 20 can be reduced.

Furthermore, if a depth test is performed by the chunk data buffer 110, the pixel processor 20 can not process a pixel which finally becomes a hidden surface.

What is claimed is:
1. An image rendering device, comprising:
a fragment generator configured to generate a set of fragments including pixels in different positions based on inputted pixel data and store them as rasterization results in the data buffer, wherein the fragment genera- tor reads the rasterization result in an identical coordinate position which is already stored in the data buffer, and merges pixel data contained in the read rasterization result and the inputted pixel data and stores them as one rasterization result in the data buffer when the pixel data contained in the read rasterization result and the inputted pixel data do not conflict with each other;

a data buffer configured to hold rasterization results of polygons, wherein the data buffer merges the rasterization results which do not conflict with each other and holds them as one rasterization result; and a pixel processor configured to acquire the rasterization result from the data buffer and sequentially process pixel data contained in the rasterization result and contained in the fragment generated by the fragment generator, wherein the fragment is a set of pixels located adjacent to each other in a rectangular shape, and wherein the fragment is a set of pixels located apart from each other.

2. The image rendering device according to claim 1, wherein when merging the plural rasterization results, the fragment generator performs merging processing in merger units of at least two or more pixels square.

3. The image rendering device according to claim 1, wherein the data buffer comprises a plurality of data buffers.

4. The image rendering device according to claim 3, wherein a coordinate position of the fragment stored in each of the data buffers is fixed.

5. The image rendering device according to claim 1, wherein the fragment generator comprises a depth test function.

6. An image rendering method comprising:
storing rasterization results of polygons in a data buffer;
merging the rasterization results which do not conflict witch each other and storing them as one rasterization result in the data buffer;
acquiring the rasterization result from the data buffer and sequentially processing pixel data contained in the rasterization result;
generating a set of fragments including pixels in different positions based on the inputted pixel data and storing them as rasterization results in the data buffer;
reading the rasterization result in an identical coordinate position which is already stored in the data buffer; and
merging pixel data contained in the read rasterization result and the inputted pixel data and storing them as one rasterization result in the data buffer when the pixel data contained in the read rasterization result and the inputted pixel data do not conflict with each other.

7. The image rendering method according to claim 6, wherein when the plural rasterization results are merged, merging processing is performed in merger units of at least two or more pixels square.

8. The image rendering method according to claim 6, wherein the data buffer comprises a plurality of data buffers.

9. The image rendering method according to claim 8, wherein a coordinate position of the fragment stored in each of the data buffers is fixed.

10. An image rendering method, comprising:
storing rasterization results of polygons in a data buffer;
merging the rasterization results which do not conflict with each other and storing them as one rasterization result in the data buffer; and
acquiring the rasterization result from the data buffer and sequentially processing pixel data contained in the rasterization result, wherein when the rasterization result is stored in the data buffer, a depth test is performed, and pixel data having a deeper depth is abandoned.

11. A graphic system comprising:
a memory in which original vertex data to render object is stored;
a CPU configured to read out the original vertex data from the memory to execute processing and output the result of the processing as processed vertex data; and
an image rendering device including:
a rasterizer to which the processed vertex data is inputted from the CPU and which performs a rasterizing process for the processed vertex data and outputs pixel data;
a fragment generator configured to generate a set of fragments including pixels in different positions based on the inputted pixel data from the rasterizer, wherein the sets of the fragments are regarded as rasterization results;
a data buffer in which the rasterization results are stored from the fragment generator, wherein the fragment generator merges the rasterization results which do not conflict with each other and stores them as one rasterization result in the data buffer; and
a pixel processor configured to acquire the rasterization result from the data buffer and sequentially process the pixel data contained in the rasterization result.

12. An image rendering device, comprising:
a fragment generator configured to generate sets of fragments including pixels in different positions based on inputted pixel data from a rasterizer, wherein the sets of the fragments are regarded as rasterization results;
a data buffer in which the rasterization results are stored from the fragment generator, wherein the fragment generator merges the rasterization results which do no conflict with each other and stores them as one rasterization result in the data buffer; and
a pixel processor configured to acquire the rasterization result from the data buffer and sequentially process pixel data contained in the rasterization result.

13. The image rendering device according to claim 12, wherein the fragment generator reads from the data buffer the rasterization result in an identical coordinate position to the inputted pixel data, and the fragment generator merges the pixel data contained in the read rasterization result and the inputted pixel data and stores them as one rasterization result in the data buffer when the pixel data contained in the read rasterization result and the inputted pixel data do not conflict with each other.

14. The image rending device according to claim 13, wherein when merging the plural rasterization results, the fragment generator performs merging processing in merger units of at least two or more pixels square.

15. The image rendering device according to claim 12, wherein the data buffer comprises a plurality of data buffers.

16. The image rendering device according to claim 15, wherein a coordinate position of the fragment stored in each of the data buffers is fixed.

17. The image rendering device according to claim 12, wherein the fragment generator comprises a depth test function.

18. An image rendering method, comprising:
generating sets of fragments including pixels in different position based on inputted pixel data from a rasterizer, wherein the sets of the fragments are regarded as rasterization results;

storing the rasterization results from the fragment generator in a data buffer;

merging the rasterization results which do not conflict with each other and storing them as one rasterization result in the data buffer; and acquiring the rasterization result from the data buffer and sequentially processing pixel data contained in the rasterization result.

19. The image rending method according to claim 18, wherein the merging comprises:

reading from the data buffer the rasterization result in an identical coordinate position to the inputted pixel data; and merging the pixel data contained in the read rasterization result and the inputted pixel data and storing them as one rasterization result in the data buffer when the pixel data contained in the read rasterization result and the inputted pixel data do not conflict with each other.

20. The image rendering method according to claim 19, wherein when the plural rasterization results are merged, merging processing is performed in merger units of at least two or more pixels square.

21. The image rendering method according to claim 18, wherein the data buffer comprises a plurality of data buffers.

22. The image rendering method according to claim 21, wherein a coordinate position of the fragment stored in each of the data buffers is fixed.

23. The image rendering method according to claim 18, wherein when the rasterization result is stored in the data buffer, a depth test is performed, and pixel data having a deeper depth is abandoned.

* * * * *